(12) United States Patent
Vijayrao et al.

(10) Patent No.: US 11,775,434 B2
(45) Date of Patent: Oct. 3, 2023

(54) SYSTEMS AND METHODS FOR PRE-PROCESSING AND POST-PROCESSING COHERENT HOST-MANAGED DEVICE MEMORY

(71) Applicant: Meta Platforms, Inc., Menlo Park, CA (US)

(72) Inventors: Narsing Krishna Vijayrao, Santa Clara, CA (US); Christian Markus Petersen, Golden, CO (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/235,756

(22) Filed: Apr. 20, 2021

(65) Prior Publication Data
US 2022/0334972 A1 Oct. 20, 2022

(51) Int. Cl.
*G06F 12/0817* (2016.01)
(52) U.S. Cl.
CPC .... *G06F 12/0828* (2013.01); *G06F 2212/621* (2013.01)
(58) Field of Classification Search
CPC ........................ G06F 12/0828; G06F 2212/621
See application file for complete search history.

(56) References Cited

U.S. PATENT DOCUMENTS

| | | | |
|---|---|---|---|
| 2013/0191601 A1* | 7/2013 | Peterson | G06F 12/0868 711/E12.017 |
| 2014/0040639 A1* | 2/2014 | Raam | G06F 21/78 713/193 |
| 2015/0199126 A1 | 7/2015 | Jayasena et al. | |
| 2019/0050335 A1 | 2/2019 | Natu et al. | |
| 2020/0054306 A1* | 2/2020 | Mehanian | G06N 3/084 |
| 2021/0099251 A1 | 4/2021 | Podlozhnyuk et al. | |
| 2022/0050780 A1* | 2/2022 | Passint | G06F 13/4027 |

OTHER PUBLICATIONS

International Search Report and Written Opinion for International Application No. PCT/US2022/025490, dated Jul. 27, 2022, 15 pages.
Islam M., et al., "On-The-Fly Page Migration and Address Reconciliation for Heterogeneous Memory Systems," ACM Journal on Emerging Technologies in Computing Systems, vol. 16, No. 1, Article 10, Jan. 2020, 27 pages.

* cited by examiner

*Primary Examiner* — Baboucarr Faal
(74) *Attorney, Agent, or Firm* — Greenberg Traurig, LLP

(57) ABSTRACT

The disclosed computer-implemented method may include receiving, from a host via a cache-coherent interconnect, a request to access an address of a coherent memory space of the host. When the request is to write data, the computer-implemented method may include (1) performing, after receiving the data, a post-processing operation on the data to generate post-processed data and (2) writing the post-processed data to a physical address of a device-attached physical memory mapped to the address. When the request is to read data, the computer-implemented method may include (1) reading the data from the physical address of a device-attached physical memory mapped to the address, (2) performing, before responding to the request, a pre-processing operation on the data to generate pre-processed data, and (3) returning the pre-processed data to the external host via the cache-coherent interconnect. Various other methods, systems, and computer-readable media are also disclosed.

20 Claims, 18 Drawing Sheets

SYSTEMS AND METHODS FOR PRE-PROCESSING AND POST-PROCESSING COHERENT HOST-MANAGED DEVICE MEMORY

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
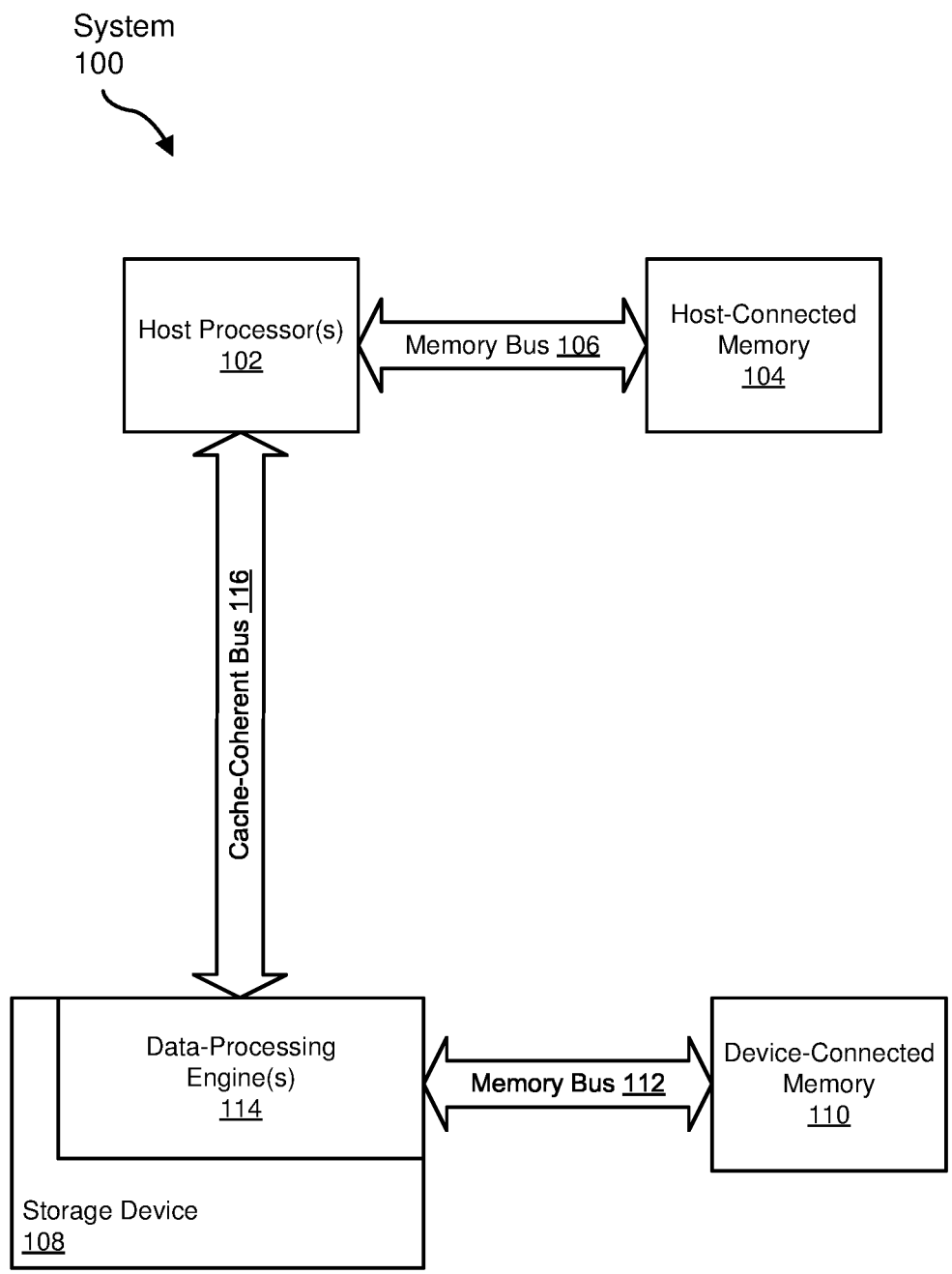
FIG. 1 is a block diagram of an exemplary coherent memory system including an exemplary storage device with a data-processing engine.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The demand for handling complex computational and memory intensive workloads (such as those involved in Artificial Intelligence (AI), Machine Learning (ML), analytics, image processing, and video transcoding) is expanding at an ever-increasing rate. Computational and memory intensive workloads are increasingly performed by heterogeneous processing and memory systems that include general-purpose host processors, task-specific accelerators, and memory expanders. For many computationally intensive and/or memory intensive workloads, it may be advantageous to coherently share and/or cache expandable memory resources between general-purpose host processors and/or task-specific accelerators via a chip-to-chip interconnect, external bus, or expansion bus.

Unfortunately, many conventional systems with coherent shared memory spaces may be limited by the bandwidths and/or the latencies of the chip-to-chip interconnects, external buses, or expansion buses that connect their general-purpose host processors and/or task-specific accelerators to memory expanders, especially when these systems perform workloads that involve extensive pre-processing of data. For example, many AI computer vision workloads often require images or videos to be decoded and/or transformed before being further processed or analyzed. Additionally, many ML workloads involve sparse data that are accessed multiple times for simple computations. While conventional coherently shared and/or cached memory resources may enable general-purpose host processors and/or task-specific accelerators to quickly perform these types of pre-processing operations via a local cache, these types of pre-processing operations may generate large amounts of data movement between local caches and expandable memory resources, which may consume bandwidth and increase the power consumption and overall-latency of these pre-processing operations. Accordingly, the instant disclosure identifies and addresses a need for additional and improved systems and methods for reducing data movement across the chip-to-chip interconnects, external buses, or expansion buses that enable shared coherent memory spaces.

This application is generally directed to storage devices (e.g., memory expanders, memory accelerators, and/or other types or forms of memory devices) that perform various pre- and/or post-processing operations on data read from or written to device-connected memory via a cache-coherent interconnect. Embodiments of the present disclosure may pre-process data read from coherent host-managed device memory before transmitting results of the pre-processing to a general-purpose host processor or task-specific accelerator and/or may post-process data received from a general-purpose host processor or task-specific accelerator before writing results of the post-processing to coherent host-managed device memory. By performing pre- and/or post-processing operations on behalf of external host processors and/or task-specific accelerators, the disclosed storage systems may reduce data movement to and from these external data processing devices and/or may reduce the computational loads of these external data processing devices.

In exemplary embodiments, the disclosed storage devices may write a received image or video to memory, decode the image or the video from memory, and then write the decoded image/video back to memory. The decoded image/video may then be made accessible to an external host processor and/or task-specific accelerator for further processing and/or analysis (e.g., via a simple read operation). In some embodiments, the disclosed storage devices may receive an operation/function (e.g., a summation operation or a database operation) to perform on data stored to host-managed device memory, perform the operation/function locally, and then return a result of the operation to an external host processor and/or task-specific accelerator for further processing and/or write the result of the operation back to memory for later access by the external host processor and/or task-specific accelerator.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-5, detailed descriptions of exemplary coherent storage systems capable of performing various pre- and post-processing operations in connection with reads and writes to coherent host-managed device memory. The discussions corresponding to FIGS. 6-18 will provide detailed descriptions of corresponding methods and data flows.

FIG. 1 is a block diagram of an exemplary cache-coherent storage system 100. Cache-coherent storage system 100 may include one or more host processor(s) 102 (e.g., host central processing units (CPUs)) directly attached to a host-connected memory 104 via a memory bus 106 and a storage device 108 directly attached to a device-connected memory 110 via a memory bus 112. As shown, host processor(s) 102 and storage device 108 may be interconnected through a cache-coherent bus 116. In some embodiments, host processor(s) 102 may read and write data directly to host-connected memory 104 through memory bus 106 and indirectly to device-connected memory 110 through cache-coherent bus 116. Additionally or alternatively, storage device 108 may read and write data directly to device-connected memory 110 through memory bus 112 and indirectly to host-connected memory 104 through cache-coherent bus 116. In some embodiments, host processor(s) 102, storage system 108, and/or any number of additional devices, not shown, may reference and/or access memory locations contained in host-connected memory 104 and device-connected memory 110 using a coherent memory space or address space (e.g., coherent memory space 710 illustrated in FIGS. 7-10) that includes one or more host address ranges mapped to cacheable memory locations contained in host-connected memory 104 and/or one or more address ranges mapped to cacheable memory locations contained in device-connected memory 110.

As shown in FIG. 1, storage device 108 may include one or more data-processing engine(s) 114 for pre- and/or post-processing data read from and/or written to device-connected memory 110 via cache-coherent bus 116. Data-processing engine(s) 114 may include any suitable physical processor or processors capable of and/or optimized for performing one or more of the pre- and post-processing operations (e.g., decoding operations, transforming operations, reduction operations, pooling operations, etc.) described herein. Examples of data-processing engine(s) 114 include, without limitation, microprocessors, microcontrollers, Central Processing Units (CPUs), Digital signal processors (DSPs), Field-Programmable Gate Arrays (FPGAs), Application-Specific Integrated Circuits (ASICs), portions of one or more of the same, variations or combinations of one or more of the same, or any other suitable physical processor.

Figure 2:
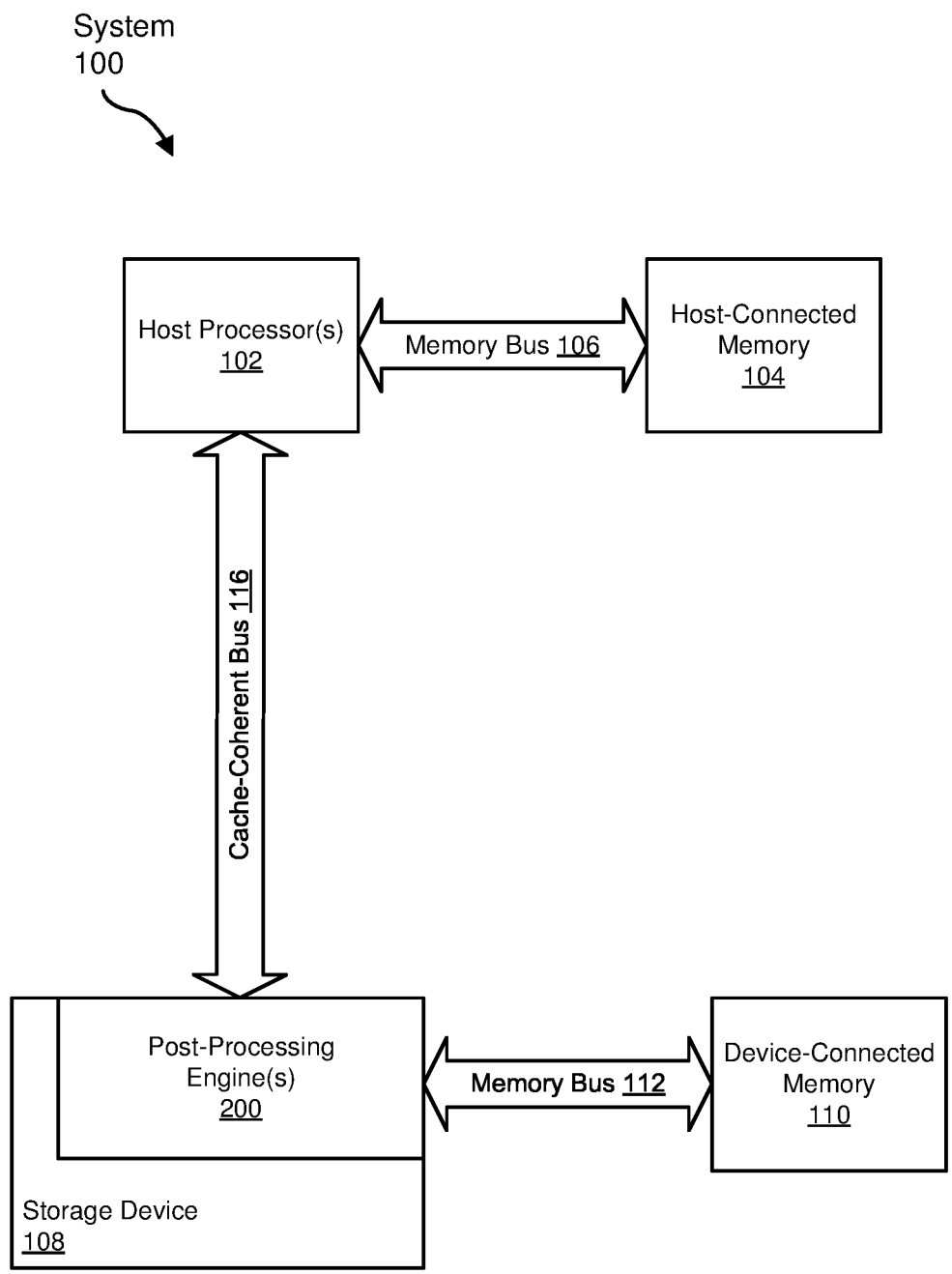
FIG. 2 is a block diagram of an exemplary coherent memory system including an exemplary storage device with an exemplary post-processing engine.

As shown in FIG. 2, data-processing engine(s) 114 may include one or more post-processing engine(s) 200 capable of performing one or more post-reception operations on data written, via cache-coherent bus 116, to the host addresses mapped to cacheable memory locations contained in device-connected memory 110. As used herein, the terms post-reception operation, post-processing, and/or post-processing operation may refer to any data operation locally performed by the disclosed storage systems on data received over a cache-coherent interconnect before storing the received data to device-connected memory 110, as part of storing the received data to device-connected memory 110, and/or as part of storing a result of processing the received data to device-connected memory 110.

Figure 3:
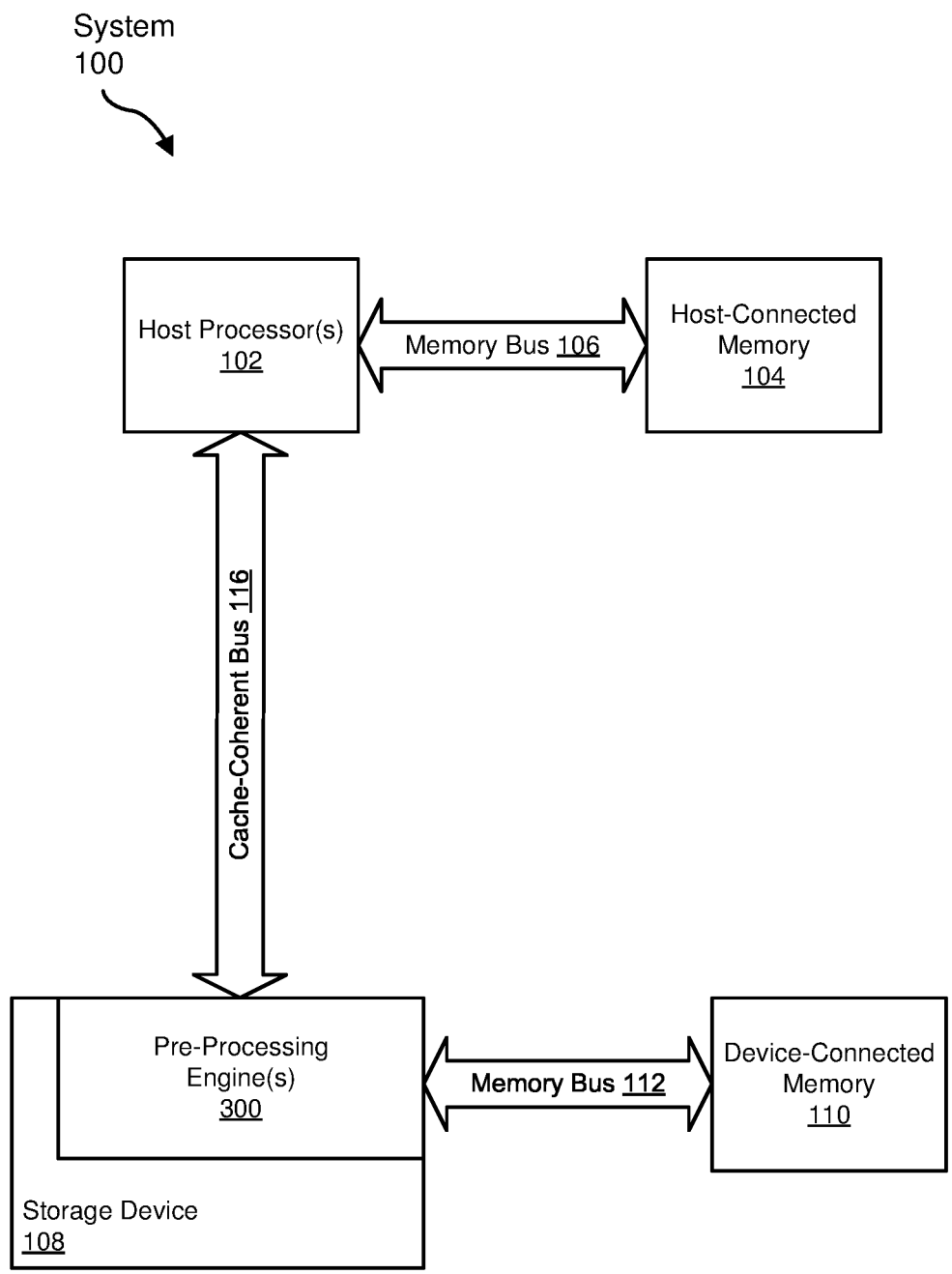
FIG. 3 is a block diagram of an exemplary coherent memory system including an exemplary storage device with an exemplary pre-processing engine.

As shown in FIG. 3, data-processing engine(s) 114 may include one or more pre-processing engine(s) 300 capable of performing one or more pre-transmission operations on data read, via cache-coherent bus 116, from the host addresses mapped to cacheable memory locations contained in device-connected memory 110. As used herein, the terms pre-transmission operation, pre-processing, and/or pre-processing operation may refer to any data operation locally performed by the disclosed storage systems on data read from device-connected memory 110 before transmitting a result of processing the data across cache-coherent bus 116, as part of reading data from device-connected memory 110, and/or as part of responding to a request for the result of pre-processing data from device-connected memory 110.

Any pre- or post-processing operation typically performed by conventional general-purpose host processors and/or task-specific accelerators may be off-loaded to and performed by post-processing engine(s) 200 and/or pre-processing engine(s) 300 during and/or in connection with data access operations. Examples of post-reception operations, post-processing, and/or post-processing operations and/or pre-transmission operations, pre-processing, and/or pre-processing operations include, without limitation, data-cleansing operations, data-selection operations, binning operations, discretizing operations, regression operations, clustering operations, data-partitioning operations, data-aggregation operations, data-reduction operations, data-pooling operations, data-analyzing operations, standardizing operations, normalizing operations, categorization operations, feature-engineering operations, feature-tuning operations, representation transformations, feature-extracting operations, feature-selecting operations, feature-constructing operations, encoding operations, decoding operations, rotation operations, scaling operations, color-space conversions, color corrections, denoising operations, cropping operations, exposure compensations, lens-distortion compensations, a geometric transformations, frame-extracting operations, summation operations, subtraction operation, multiplication operations, division operations, logical operations, mathematical operations, scalar operations, matrix operations, one or more of the same, variations or combinations of one or more of the same, or any other suitable data process, function, or transformation.

In some embodiments, one or more of post-processing engine(s) 200 may be configured to post-process all data received over cache-coherent bus 116, and/or one or more of pre-processing engine(s) 300 may be configured to pre-process all data read from device-connected memory 110 before transmission over cache-coherent bus 116. In other embodiments, one or more of post-processing engine(s) 200 may be configured to post-process only data written to certain ranges of host addresses mapped to device-connected memory 110, and/or one or more of pre-processing engine(s) 300 may be configured to pre-process only data read from certain ranges of the host addresses mapped to device-connected memory 110. Additionally or alternatively, one or more of post-processing engine(s) 200 may be configured to selectively or differently post-process the data written to host addresses mapped to device-connected memory 110 based on instructions received via cache-coherent bus 116, and/or one or more of pre-processing engine(s) 300 may be configured to selectively or differently pre-process all of the data read from the host addresses mapped to device-connected memory 110 based on instructions received via cache-coherent bus 116.

Host-connected memory 104 and/or device-connected memory 110 may represent any type or form of memory capable of storing cacheable data. Examples of host-connected memory 104 and/or device-connected memory 110 include, without limitation, dynamic randomly addressable memory (DRAM), static randomly addressable memory (SRAM), High Bandwidth Memory (HBM), cache memory, volatile memory, non-volatile memory (e.g., Flash memory), or any other suitable form of computer memory. Memory bus 106 and memory bus 112 may represent any internal memory bus suitable for interfacing with host-connected memory 104 and/or device-connected memory 110. Examples of memory bus 106 and memory bus 112 include, without limitation, Double Data Rate (DDR) buses (e.g., Low Power DDR buses), Serial ATA (SATA) buses, Serial Attached SCSI (SAS) buses, High Bandwidth Memory (HBM) buses, Peripheral Component Interconnect Express (PCIe) buses, and the like.

Cache-coherent bus 116 may represent any high-bandwidth and/or low-latency chip-to-chip interconnect, external bus, or expansion bus capable of hosting a providing connectivity (e.g., I/O, coherence, and/or memory semantics) between host processor(s) 102 and external devices or packages such as caching devices, workload accelerators (e.g., Graphics Processing Unit (GPU) devices, Field-Programmable Gate Array (FPGA) devices, Application-Specific Integrated Circuit (ASIC) devices, machine learning accelerators, tensor and vector processor units, etc.), memory expanders, and memory buffers. In some embodiments, cache-coherent bus 116 may include a standardized interconnect (e.g., a Peripheral Component Interconnect Express (PCIe) bus), a proprietary interconnect, or some combination thereof. In at least one embodiment, cache-coherent bus 116 may include a compute express link (CXL) interconnect such as those illustrated in FIGS. 4 and 5.

Figure 4:
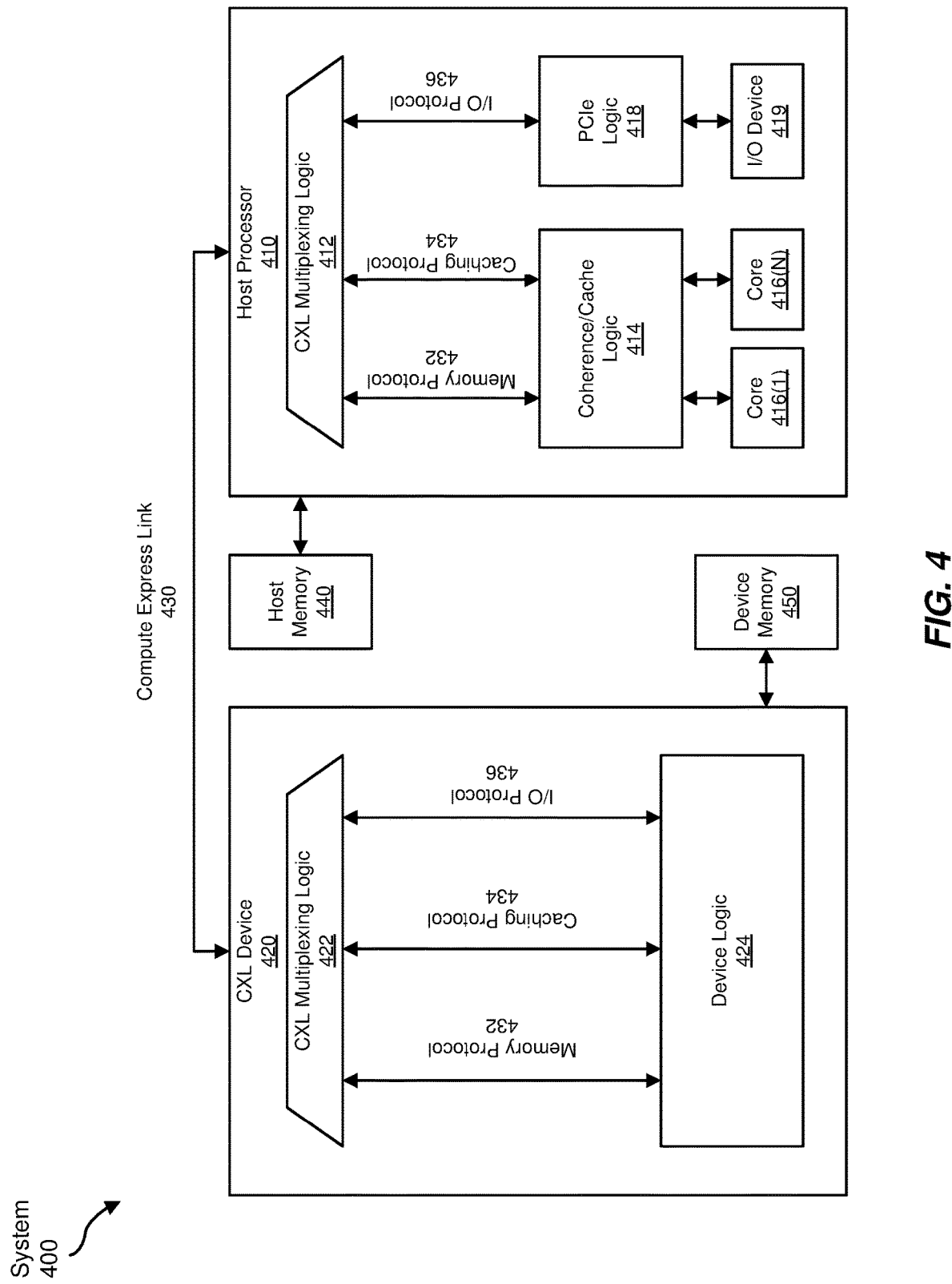
FIG. 4 is a block diagram of portions of an exemplary compute express link system.

Example system 100 in FIG. 1 may be implemented in a variety of ways. For example, all or a portion of example system 100 may represent portions of an example system 400 in FIG. 4. As shown in FIG. 4, system 400 may include a host processor 410 connected to a CXL device 420 via a compute express link 430. In some embodiments, host processor 410 may be directly connected to a host memory 440 via an internal memory bus, and CXL device 420 may be directly connected to a device memory 450 via an internal memory bus. In this example, the internal components of host processor 410 may communicate over compute express link 430 with the internal components of CXL device 440 using one or more CXL protocols (e.g., a memory protocol 432, a caching protocol 434, and/or an I/O protocol 436) that are multiplexed by multiplexing logic 412 and 422.

Figure 5:
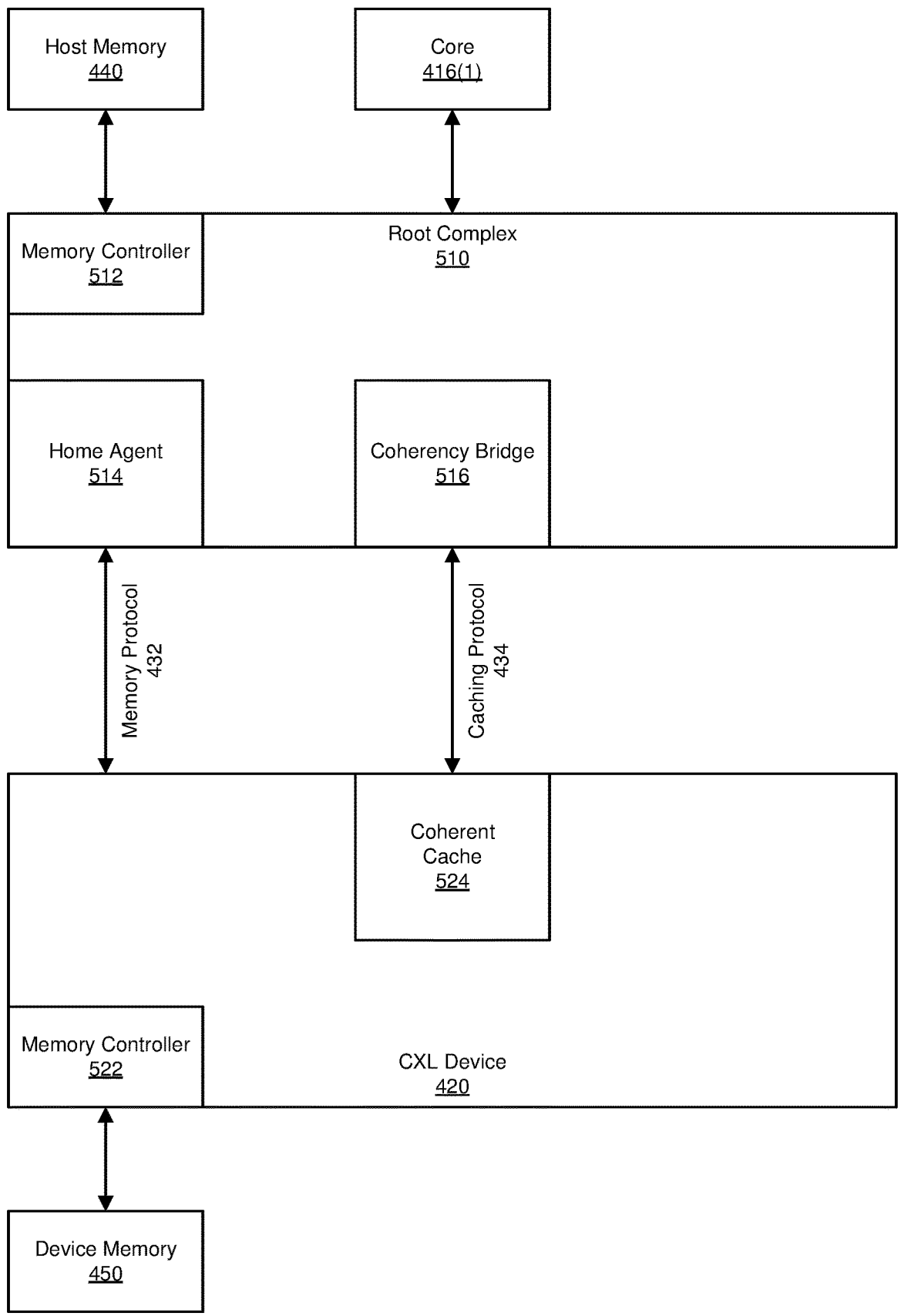
FIG. 5 is a block diagram of portions of an exemplary compute express link system.

As shown in FIG. 4, host processor 410 may include one or more processing core(s) 416 that are capable of accessing and caching data stored to host memory 440 and device memory 450 via coherence/cache logic 414. Host processor 410 may also include an I/O device 419 that is capable of communication over compute express link 430 via PCIe logic 418. As shown in FIG. 5, in some embodiments, host processor 410 may include a root complex 510 (e.g., a PCIe compatible root complex) that connects one or more of cores 416 to host memory 440 and device memory 450. In this example, root complex 510 may include a memory controller 512 for managing read and write operations to host memory 440, a home agent 514 for performing translations between physical, channel, and/or system memory addresses, and a coherency bridge 516 for resolving system wide coherency for a given host address. As shown in FIG. 4, CXL device 420 may include device logic 424 for performing memory and CXL protocol tasks. In some embodiments, device logic 424 may include one or more pre- and/or post-processing engines, such as those described in connection with FIGS. 1-3, and a memory controller that manages read and write operations to device memory 450 (e.g., as shown in FIG. 5). In at least one embodiment, CXL device 420 may include a coherent cache 524 for caching host-managed data (e.g., data stored to host memory 440 or device memory 450).

Figure 6:
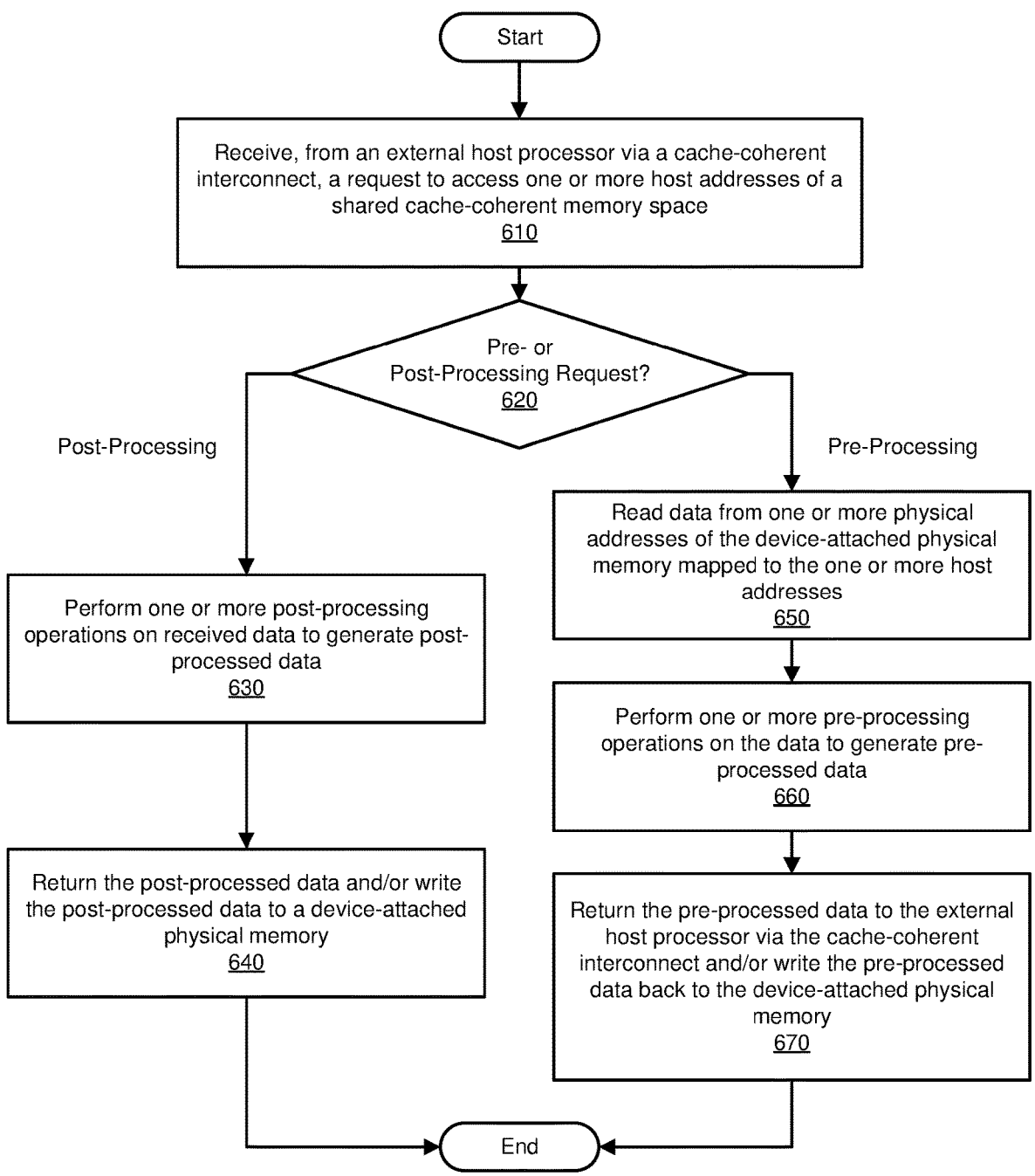
FIG. 6 is a flow diagram of an exemplary method for pre- and/or post-processing data read from and/or written to coherent host-managed device memory.

FIG. 6 is a flow diagram of an exemplary computer-implemented method 600 for pre- and/or post-processing data in connection with reads and writes to coherent host-managed device memory. The steps shown in FIG. 6 may be performed by any suitable computer-executable code and/or computing system, including the system(s) illustrated in FIGS. 1, 2, 3, 4, and 5. In one example, each of the steps shown in FIG. 6 may represent an algorithm whose structure includes and/or is represented by multiple sub-steps, examples of which will be provided in greater detail below.

As illustrated in FIG. 6, at step 610 one or more of the systems described herein may receive, from an external host processor, a request to access one or more host addresses of a shared coherent memory space. For example, data-processing engine(s) 114 may receive, from host processor 102 via cache-coherent bus 116, a request to access host address 712(M) of a shared coherent memory space 710 of host processor 102.

Figure 7:
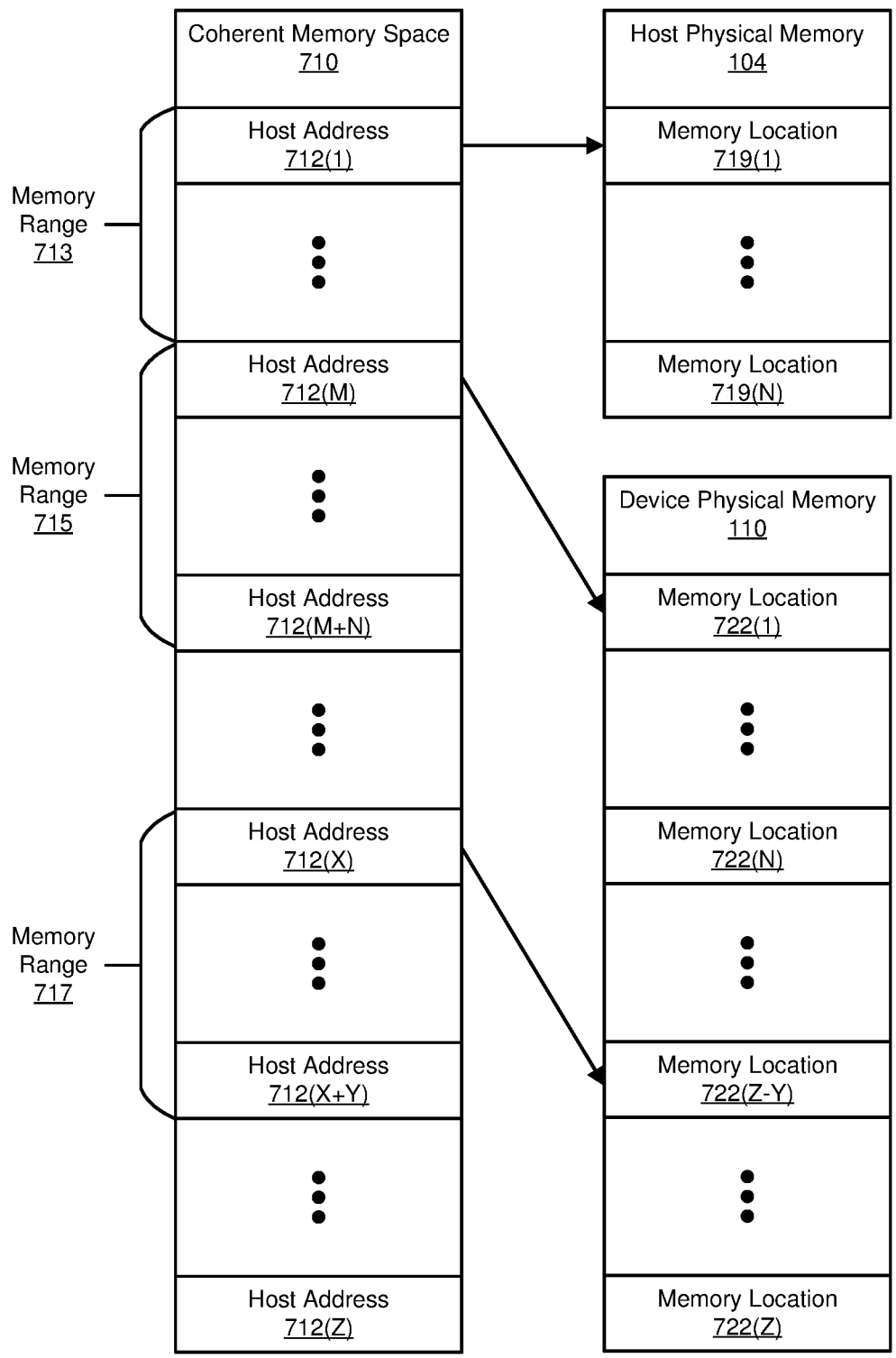
FIG. 7 is a block diagram of an exemplary coherent memory space and corresponding exemplary address mappings.

FIG. 7 illustrates an exemplary coherent memory space 710 having host addresses 712(1)-(Z) that have been mapped to (1) physical memory locations of host physical memory 104 and (2) physical memory locations of device physical memory 110. As shown, a memory range 713 of coherent memory space 710 may be mapped to memory locations 719(1)-(N) of host physical memory 104, a memory range 715 of coherent memory space 710 may be mapped to memory locations 722(1)-(N) of device physical memory 110, and a memory range 717 of coherent memory space 710 may be mapped to memory locations 722(Z-Y)-(Z) of device physical memory 110. In this example, host processors or accelerators that share access to coherent memory space 710 may read or write data to host physical memory 104 by accessing the host addresses in memory range 713. Similarly, host processors or accelerators that share access to coherent memory space 710 may read or write data to device physical memory 110 by accessing the host addresses in either of memory ranges 715 or 717.

Figure 8:
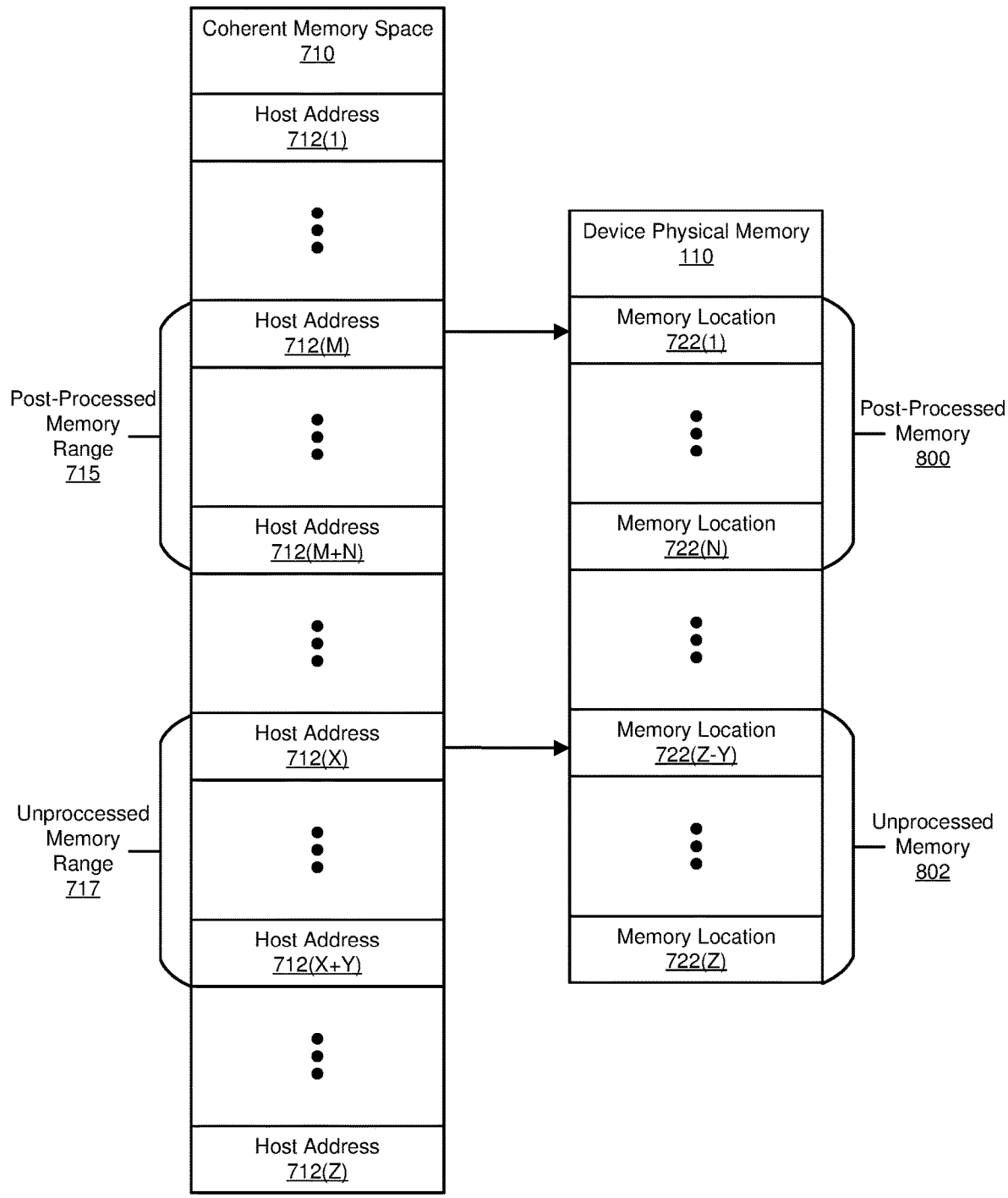
FIG. 8 is a block diagram of an exemplary coherent memory space having a region designated for writing data that will be post-processed and a region designated for writing data that will not be post-processed.
Figure 9:
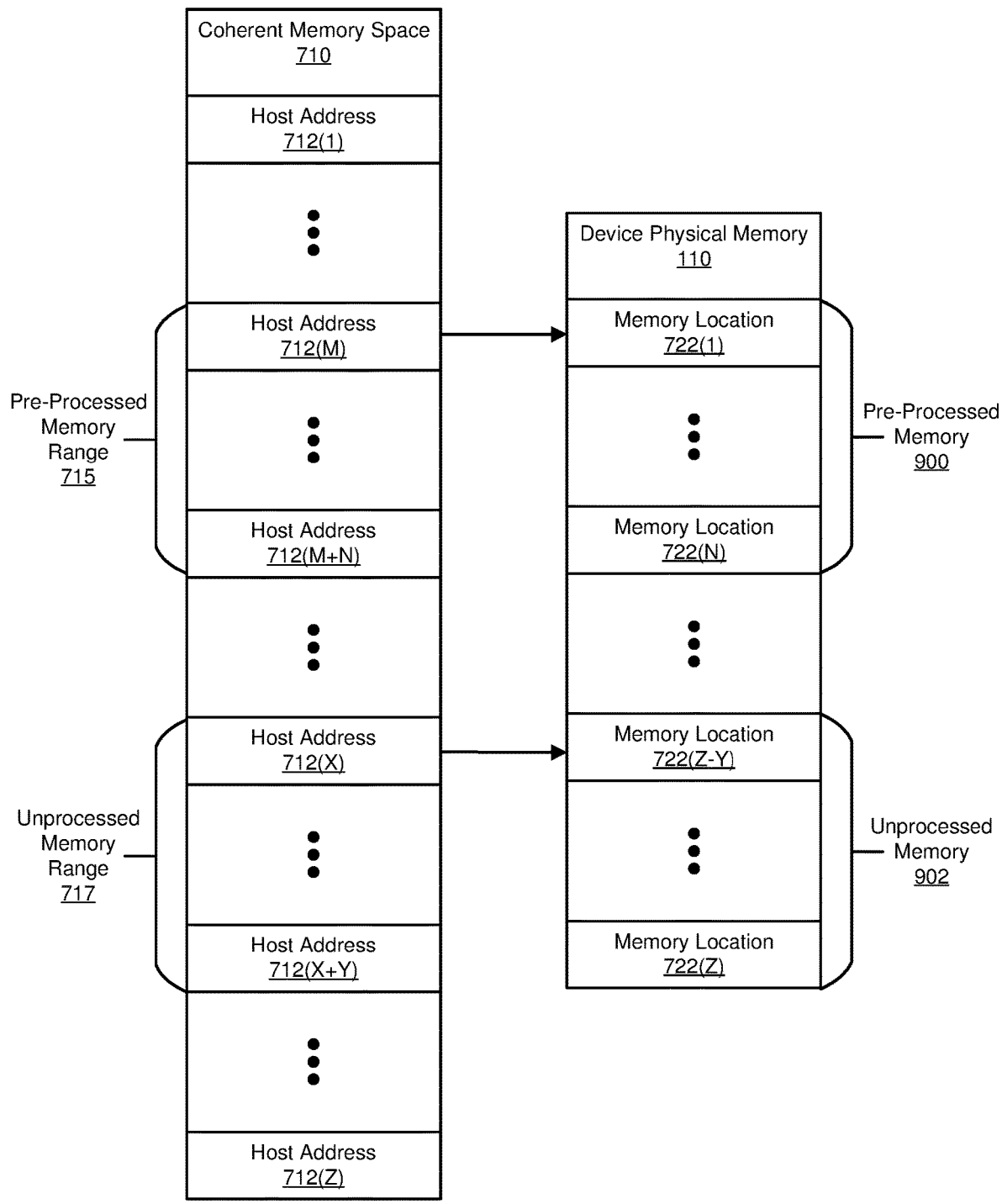
FIG. 9 is a block diagram of an exemplary coherent memory space having a region designated for reading data that will be pre-processed and a region designated for reading data that will not be pre-processed.
Figure 10:
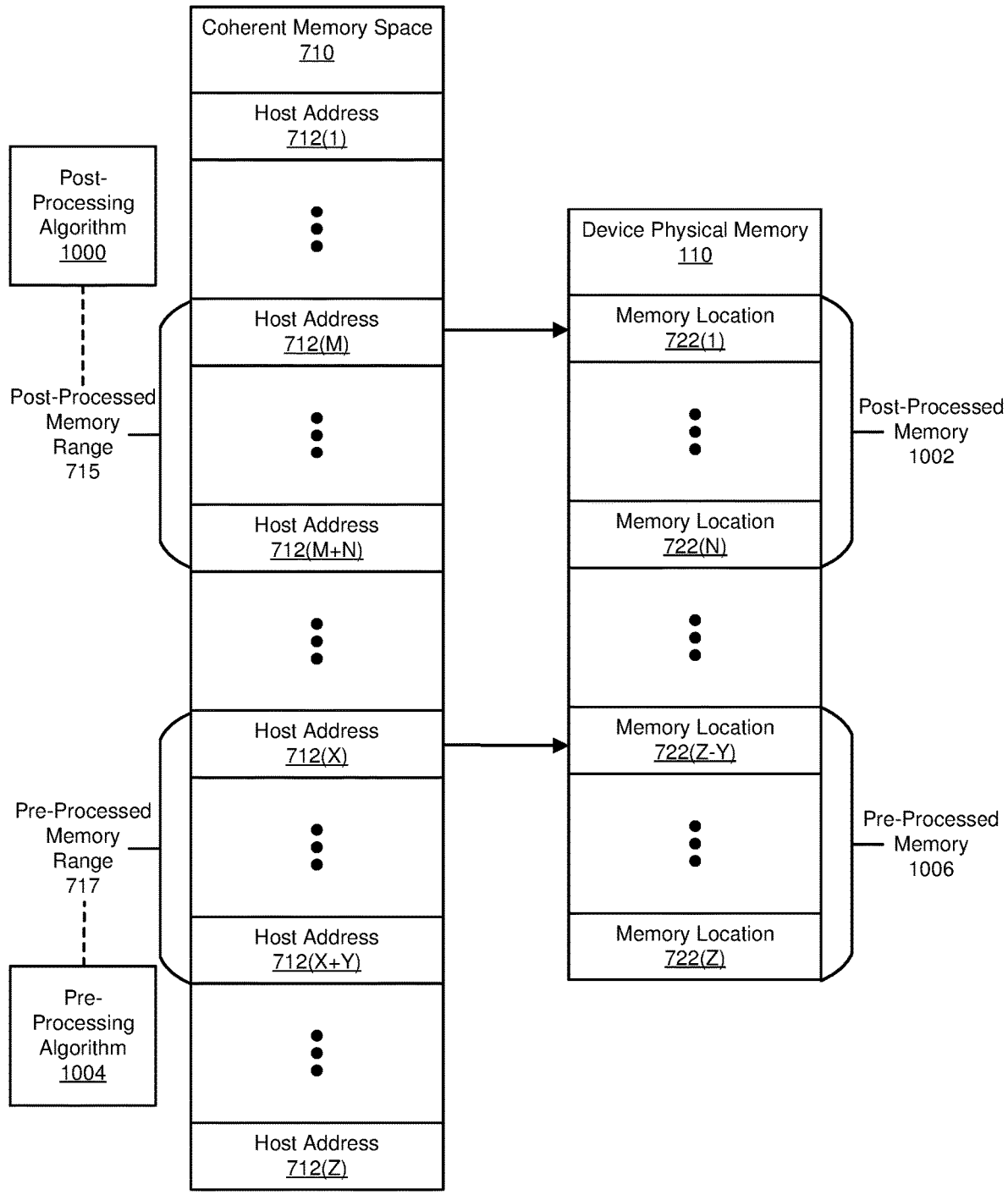
FIG. 10 is a block diagram of an exemplary coherent memory space having a region designated for writing data that will be post-processed by an associated post-processing algorithm and a region designated for reading data that will be pre-processed by an associated pre-processing algorithm.

As shown in FIGS. 8-10, one or more regions of the disclosed coherent memory spaces may be associated with one or more pre- and/or post-processing operations that may be performed on any data written to an/or read from those regions. For example, as shown in FIG. 8, memory range 715 of coherent memory space 710 may be designated for storing data that will be post-processed before being written to and/or as part of being written to post-processed memory 800 of device physical memory 110. In some embodiments, one or more regions of the disclosed coherent memory spaces may not be associated with any post-processing operations. For example, memory range 717 of coherent memory space 710 may be designated for storing data that will not be post-processed as part of being written to unprocessed memory 802 of device physical memory 110. As shown in FIG. 9, memory range 715 of coherent memory space 710 may be designated for storing data that will be pre-processed after being read from and/or as part of being read from pre-processed memory 900 of device physical memory 110. In this example, memory range 717 of coherent memory space 710 may be designated for storing data that will not be pre-processed after being read from and/or as part of being read from unprocessed memory 902 of device physical memory 110.

As shown in FIG. 10, memory ranges of coherent memory space 710 may be associated with different post-processing/pre-processing algorithms. For example, memory range 715 of coherent memory space 710 may be associated with a post-processing algorithm 1000 such that the disclosed storage devices may automatically post-process any data written to memory range 715 of coherent memory space 710 using post-processing algorithm 1000 before storage to post-processed memory 1002 of device physical memory 110. In this example, memory range 717 of coherent memory space 710 may be associated with a pre-processing algorithm 1004 such that the disclosed storage devices may automatically pre-process any data written to memory range 715 of coherent memory space 710 using pre-processing algorithm 1004 before storage to pre-processed memory 1006 of device physical memory 110.

Returning to FIG. 6 at step 620, one or more of the systems described herein may determine if the request received at step 610 is a pre-processing request (e.g., a request to perform a pre-transmission operation) or a post-processing request (e.g., a request to perform a post-reception operation). Examples of pre-processing requests include, without limitation, a request to read data from one or more host memory addresses associated with a pre-processing operation, a request to return a result of pre-processing data read from one or more host memory addresses, a request to read data from one or more host memory addresses and then write a result of pre-processing the data to the one or more host memory addresses or another one or more host memory addresses, and/or a request to read a type of data designated for pre-processing. Examples of post-processing requests include, without limitation, a request to write data to a host memory address associated with a post-processing operation, a request to write a result of post-processing data to a host memory address, a request to write data to a host memory address and a result of post-processing the data to another host memory address, a request to write data to a host memory address and return a result of post-processing the data, and/or a request to write a type of data designated for post-processing. If the request received at step 610 is a post-processing request, flow of method 600 may continue to step 630. If the request received at step 610 is a pre-processing request, flow of method 600 may continue to step 650.

At step 630, one or more of the systems described herein may perform a post-processing operation on the data included in the write request received at step 610 to produce post-processed data. For example, data-processing engine(s) 114 may perform a post-processing operation on data received from host processor 102 via cache-coherent bus 116.

When receiving a request to write data to a particular host address, the systems described herein may determine what, if any, post-processing operations should be performed on the received data. In some embodiments, requests received via cache-coherent bus 116 at step 610 may include data and an instruction to perform one or more post-processing operations on the data. The systems described herein may perform any such post-processing operations associated with the received data to generate post-processed data from the received data. In some embodiments, the systems described herein may determine what post-processing operations should be performed on the received data by determining if an associated host address falls within a range of addresses designated for post-processing. If the host address falls within a range of host addresses designated for post-processing, the systems described herein may perform one or more post-processing operations associated with the range of addresses on the received data. Additionally or alternatively, if the host address falls within more than one range of host addresses, each being separately assigned a different post-processing operation, the systems described herein may perform each post-processing operation on the received data. However, if the host address does not fall within a range of host addresses designated for post-processing, the systems described herein may refrain from performing any post-processing on the received data.

At step 640, one or more of the systems described herein may return the post-processed data to the external host processor via the cache-coherent interconnect and/or write the post-processed data to device-attached physical memory for later retrieval. For example, data-processing engine(s) 114 may, in response to receiving a request to write data to host address 712(M) of shared coherent memory space 710, write the data to memory location 722(1) and return a result of post-processing the data to host processor(s) 102 via cache-coherent bus 116. In another example, data-processing engine(s) 114 may, in response to receiving a request to write a result of post-processing data to host address 712(M) of shared coherent memory space 710, write the result of post-processed data to memory location 722(1) for later retrieval by host processor(s) 102 via cache-coherent bus 116. In another example, data-processing engine(s) 114 may, in response to receiving a request to write data to host address 712(M) of shared coherent memory space 710, write the data to memory location 722(1) and a result of post-processing the data to another one of memory locations 722 for later retrieval by host processor(s) 102 via cache-coherent bus 116. Exemplary method 600 in FIG. 6 may terminate upon the completion of step 640.

If the request received at step 610 was a pre-processing request, flow of method 600 may continue from step 620 to step 650. At step 650, one or more of the systems described herein may read data from one or more physical addresses of the device-attached physical memory mapped to the one or more host addresses received at step 610. For example, data-processing engine(s) 114 may read data from memory locations 722(1)-722(10) in response to receiving a request to pre-process data stored to host addresses 712(M)-712(M+10) of shared coherent memory space 710.

At step 660, one or more of the systems described herein may perform one or more pre-processing operations on previously stored data to produce pre-processed data. For example, data-processing engine(s) 114 may perform a pre-processing operation on data read from device-connected memory 110.

When receiving a request to access data from one or more host addresses, the systems described herein may determine what, if any, pre-processing operations should be performed on the data after being accessed from the one or more host addresses. In some embodiments, requests received via cache-coherent bus 116 at step 610 may include one or more host addresses and an instruction to perform one or more pre-processing operations on the data stored to the one or more host addresses. The systems described herein may perform any such pre-processing operations associated with the referenced data to generate pre-processed data from the referenced data. In some embodiments, the systems described herein may determine what, if any, pre-processing operations need to be performed on data by determining if an associated host address falls within a range of addresses designated for pre-processing. If the host address falls within a range of host addresses designated for pre-processing, the systems described herein may perform one or more corresponding pre-processing operations on the data to generate pre-processed data. Additionally or alternatively, if the host address falls within more than one range of host addresses, each being separately designated for pre-processing, the systems described herein may perform the corresponding pre-processing operations on the data. However, if the host address does not fall within a range of host addresses designated for pre-processing, the systems described herein may refrain from performing any pre-processing operations on the data.

At step 670, one or more of the systems described herein may return the pre-processed data to the external host processor via the cache-coherent interconnect and/or write the pre-processed data back to the device-attached physical memory for later retrieval via the cache-coherent interconnect. For example, data-processing engine(s) 114 may return pre-processed data to host processor(s) 102 via cache-coherent bus 116 and/or write the pre-processed data back to device-connected memory 110 for later retrieval via cache-coherent bus 116. Exemplary method 600 in FIG. 6 may terminate upon the completion of step 670.

Figure 11:
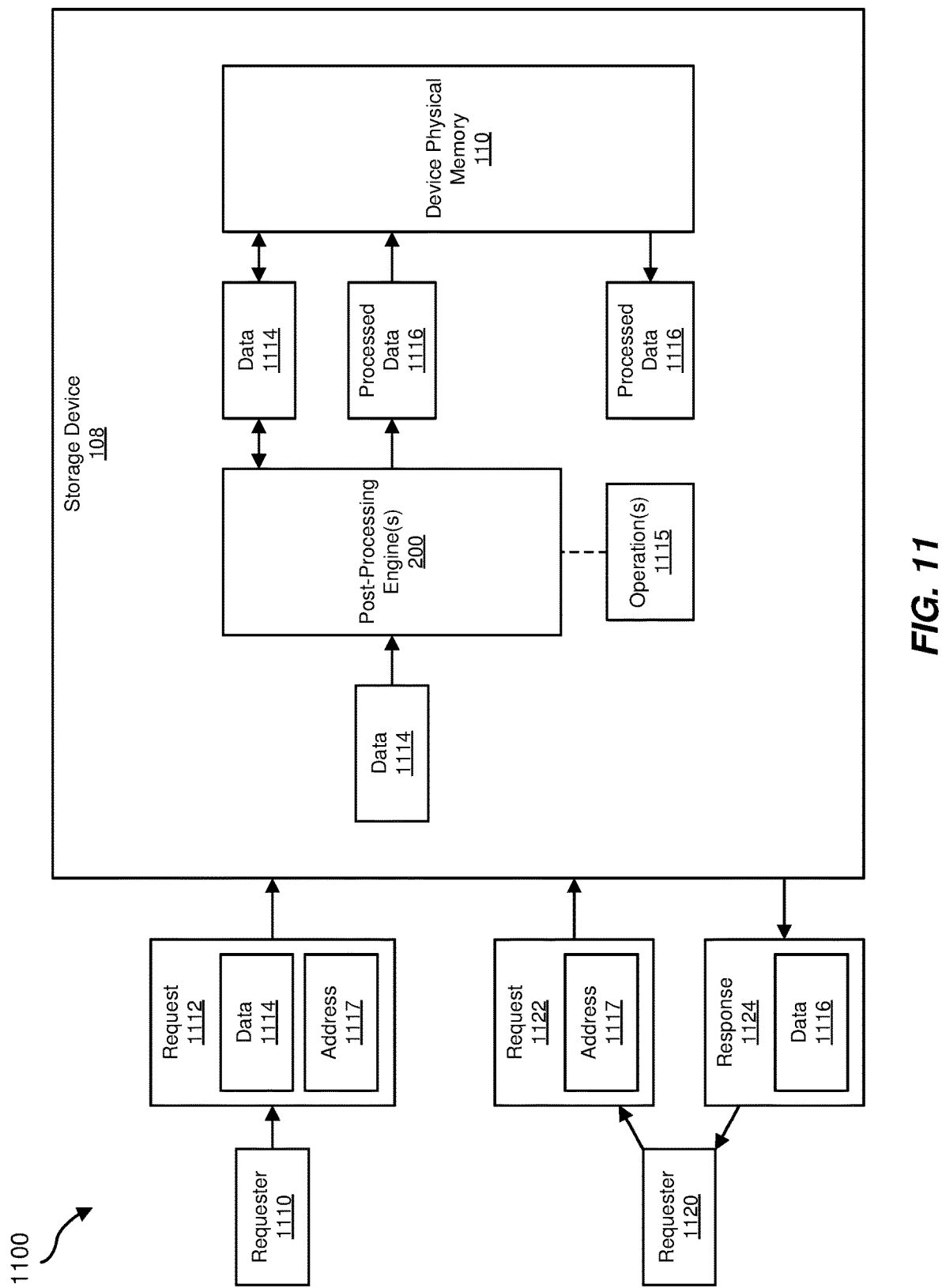
FIG. 11 is a diagram of an exemplary data flow for performing post-processing operations in connection with writes to coherent host-managed device memory.

FIGS. 11-18 illustrate various exemplary iterations of the steps shown in FIG. 6. FIG. 11 illustrates an exemplary data flow 1100 involving the exemplary post-processing of data 1114 received from a requester 1110 via cache-coherent bus 116. In this example, requester 1110 may transmit a request 1112 to write data 1114 or a result of post-processing data 1114 to a host address 1117 mapped to device physical memory 110 (e.g., host address 712(M) in FIG. 8). In some embodiments, post-processing engine(s) 200 may initially store data 1114 unprocessed to a physical address of device physical memory 110 corresponding to host address 1117 for later retrieval and/or post-processing. Alternatively, post-processing engine(s) 200 may post-process data 1114 without storing data 1114 to device physical memory 110. As shown in FIG. 11, post-processing engine(s) 200 may perform one or more post-processing operation(s) 1115 on data 1114 to generate post-processed data 1116 and may write post-processed data 1116 to device physical memory 110 for later retrieval. In this example, post-processing engine(s) 200 may store post-processed data 1116 to a physical address of device physical memory 110 mapped to address 1117, and a requester 1120 may later transmit a request 1122 to read post-processed data 1116 from host address 1117. In response to request 1122, storage device 108 may read post-processed data 1116 from device physical memory 110 and may transmit post-processed data 1116 to requester 1120 via cache-coherent bus 116 as part of a response 1124.

Figure 12:
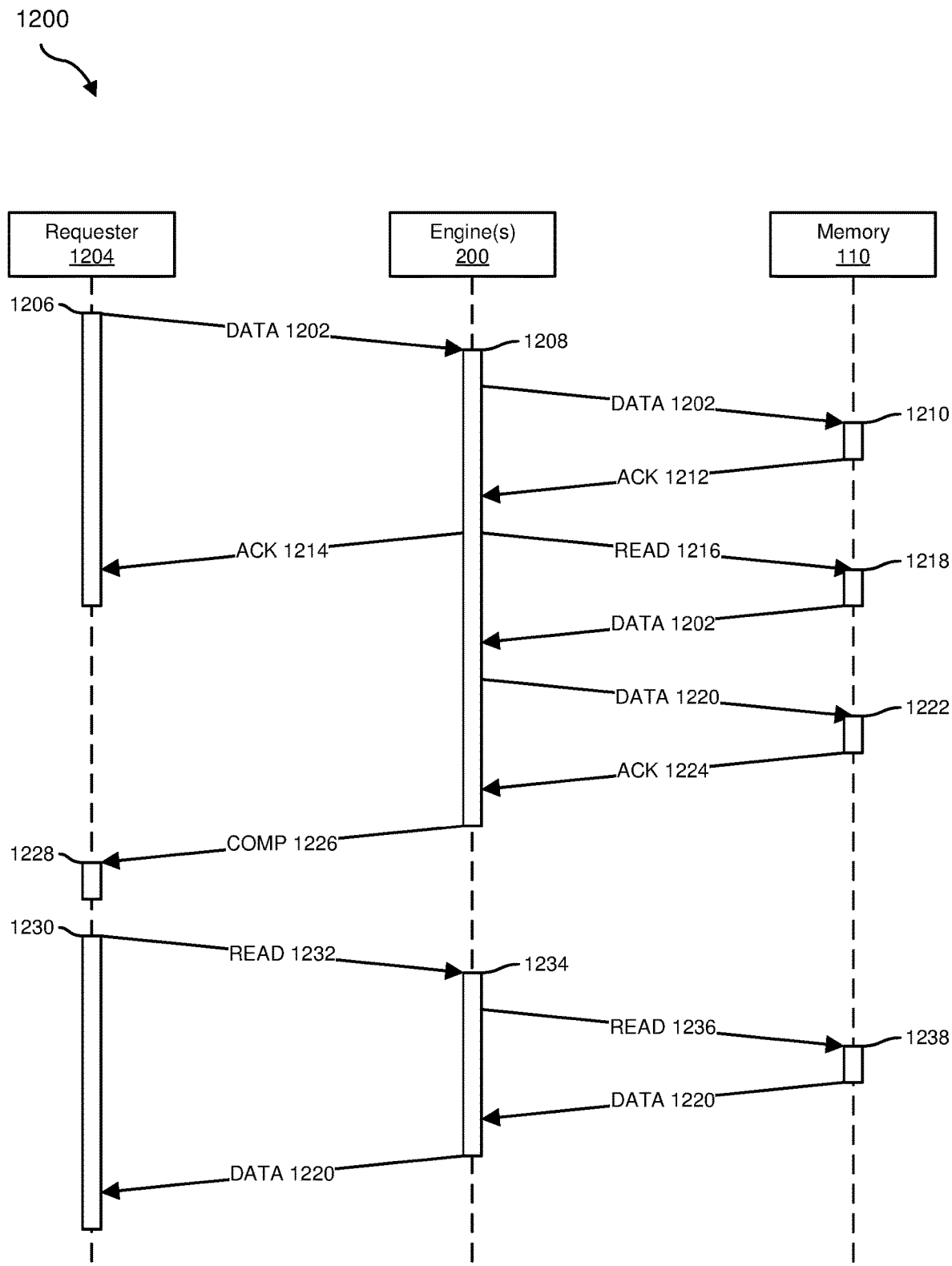
FIG. 12 is a diagram of an exemplary sequence for performing post-processing operations in connection with writes to coherent host-managed device memory.

FIG. 12 illustrates an exemplary sequence diagram 1200 involving the exemplary post-processing of data 1202 received from a requester 1204 via cache-coherent bus 116. In this example, requester 1204 may, as part of a writing activity 1206, transmit a request to write data 1202 and/or a result of post-processing data 1202 to one or more host addresses mapped to device physical memory 110. As part of a post-processing activity 1208, post-processing engine(s) 200 may receive data 1202 from requester 1204 and may store data 1202 to device physical memory 110 for later retrieval and post-processing. In response to receiving data 1202 from post-processing engine(s) 200, device physical memory 110 may, as part of completing a writing activity 1210, transmit a write acknowledgement 1212 to post-processing engine(s) 200. In response to receiving acknowledgement 1212, post-processing engine(s) 200 may respond to requester 1204 with a corresponding write acknowledgment 1214.

As shown, post-processing engine(s) 200 may continue post-processing activity 1208 by sending a read request 1216 to device physical memory 110 for data 1202. In response to read request 1216, device physical memory 110 may, as part of a read activity 1218, return data 1202 to post-processing engine(s) 200. Post-processing engine(s) 200 may continue post-processing activity 1208 by post-processing data 1202 to generate post-processed data 1220 and may write post-processed data 1220 to device physical memory 110. In response to receiving post-processed data 1222 from post-processing engine(s) 200, device physical memory 110 may, as part of completing a writing activity 1222, transmit a write acknowledgement 1224 to post-processing engine(s) 200. In response to receiving acknowledgement 1224, post-processing engine(s) 200 may transmit a notification 1226 to requester 1204 informing requester 1204 of completion of post-processing activity 1208. Requester 1204 may process notification 1226 as part of an activity 1228. Later as part of a read activity 1230, requester 1204 may send a read request 1232 to post-processing engine(s) 200 for post-processed data 1220. As part of a responding activity 1234, post-processing engine(s) 200 may send a read request 1236 to device physical memory 110 for post-processed data 1220. In response to read request 1236, device physical memory 110 may, as part of a read activity 1238, return data 1220 to post-processing engine(s) 200. Post-processing engine(s) 200 may complete responding activity 1234 by transmitting data 1220 to requester 1204 via cache-coherent bus 116.

Figure 13:
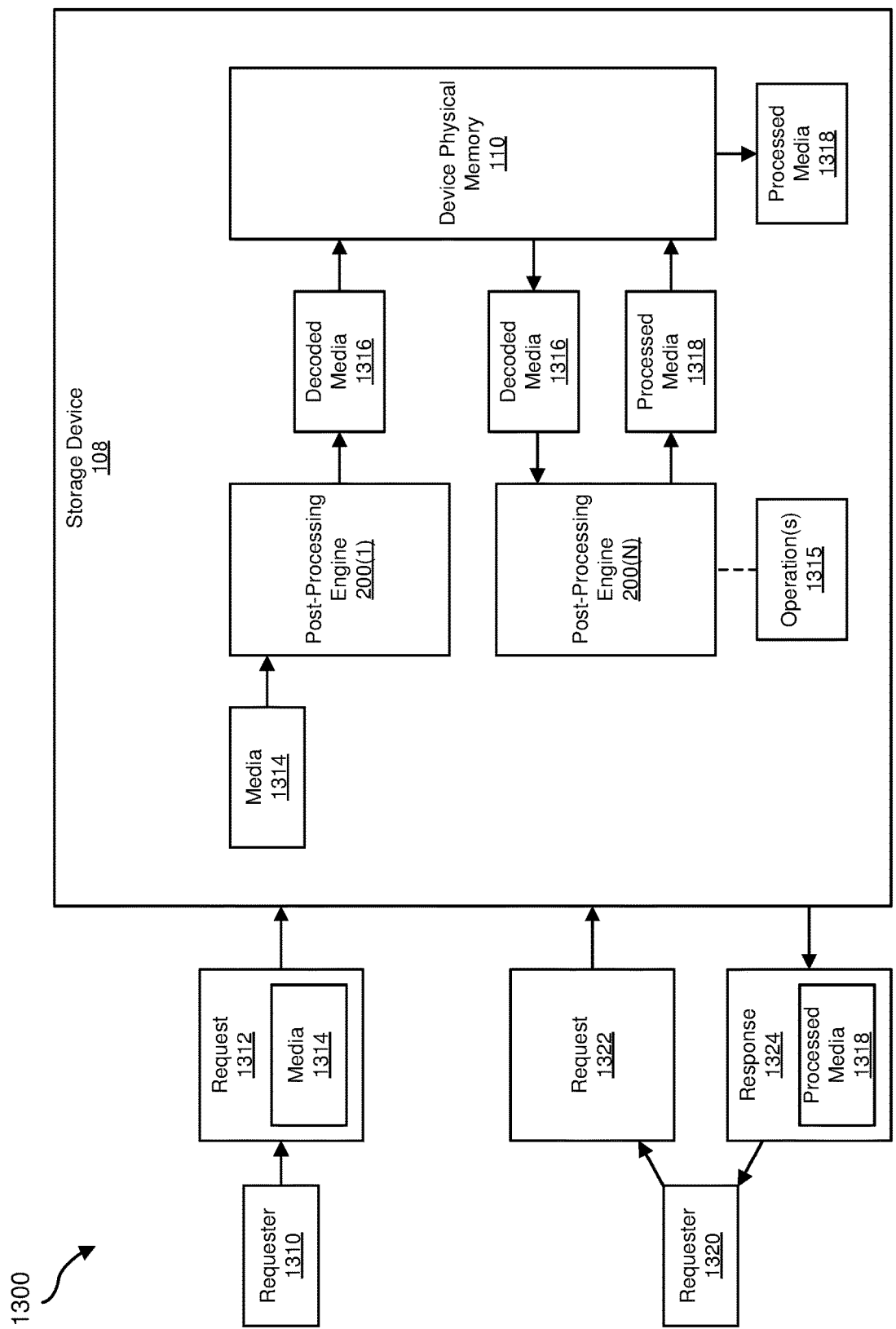
FIG. 13 is a diagram of another exemplary data flow for performing post-processing operations in connection with writes to coherent host-managed device memory.

FIG. 13 illustrates an exemplary data flow 1300 involving the exemplary post-processing of an encoded media file 1314 (e.g., an encoded image or video) received from a requester 1310 via cache-coherent bus 116. In this example, requester 1310 may transmit a request 1312 to write media file 1314 or a result of post-processing media file 1314 to a host address mapped to device physical memory 110 (e.g., host address 712(M) in FIG. 8). In some embodiments, a first post-processing engine 200(1) may decode media file 1314 to generate a decoded media file 1316 and may store decoded media file 1316 to a corresponding physical address of device physical memory 110 for later retrieval and/or further post-processing by a second post-processing engine 200(N). Alternatively, post-processing engine 200(1) may forward decoded media file 1316 to post-processing engine 200(N) without storing decoded media file 1316 to device physical memory 110. As shown in FIG. 13, post-processing engine 200(N) may read decoded media file 1316 from device physical memory 110, perform one or more additional post-processing operation(s) 1315 on decoded media file 1316 to generate a processed media file 1318 and may write processed media file 1318 to device physical memory 110 for later retrieval. In this example, a requester 1320 may later transmit a request 1322 to read processed media file 1318. In response to request 1322, storage device 108 may read post-processed media file 1318 from device physical memory 110 and may transmit post-processed media file 1318 to requester 1320 via cache-coherent bus 116 as part of a response 1324.

Figure 14:
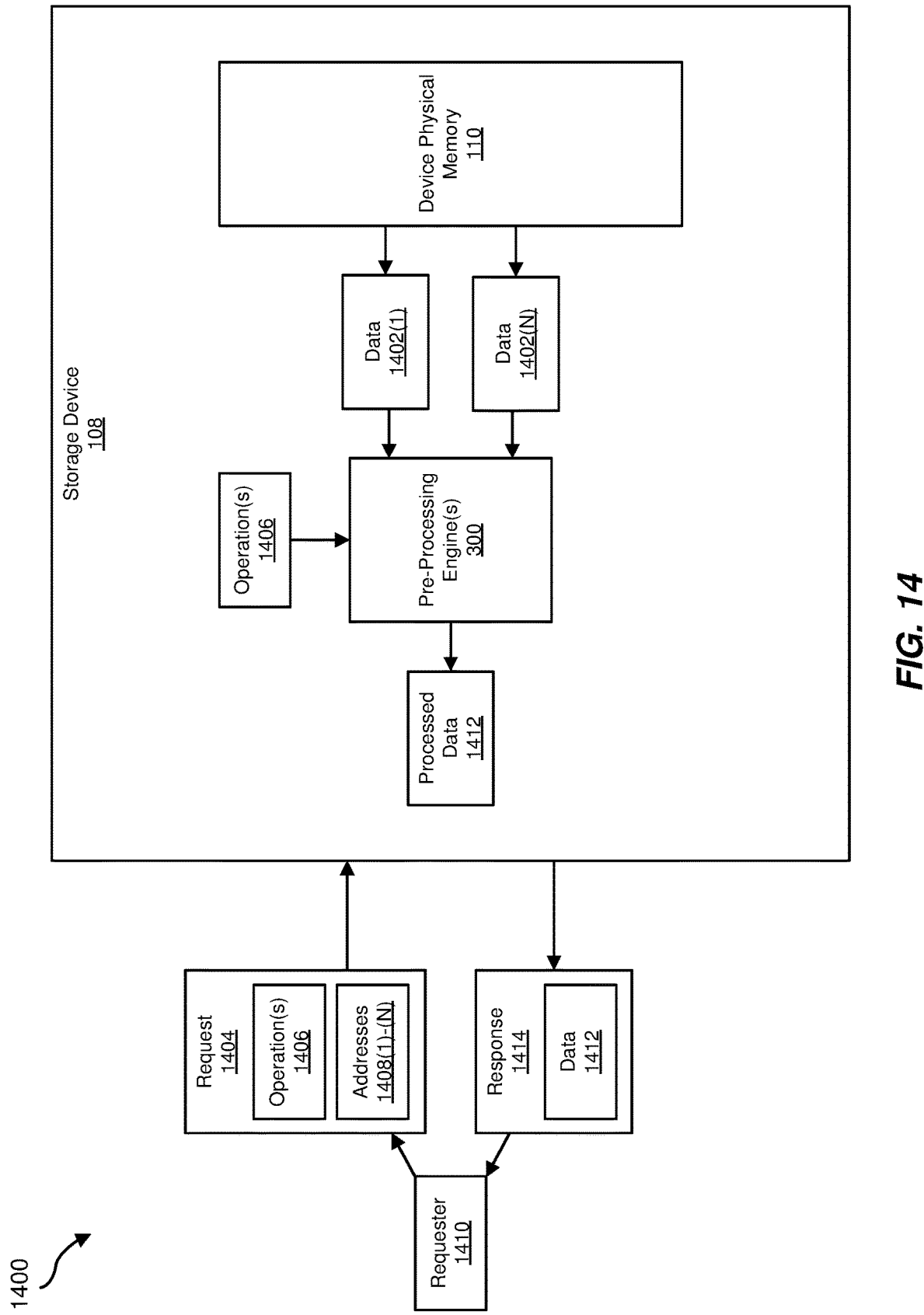
FIG. 14 is a diagram of an exemplary data flow for performing pre-processing operations in connection with reads from coherent host-managed device memory.

FIG. 14 illustrates an exemplary data flow 1400 involving the exemplary pre-processing of data 1402(1)-(N) in response to a pre-processing request 1404 received from a requester 1410 via cache-coherent bus 116. In this example, pre-processing request 1404 may include one or more pre-processing operation(s) 1406 to be performed on data stored to host addresses 1408(1)-(N). In response to pre-processing request 1404, pre-processing engine(s) 300 may read data 1402(1)-(N) from the physical addresses of device physical memory 110 corresponding to host addresses 1408(1)-(N) and may perform pre-processing operation(s) 1406 on data 1402(1)-(N) to generate pre-processed data 1412. In response to request 1404, pre-processing engine(s) 300 may transmit pre-processed data 1412 to requester 1410 via cache-coherent bus 116 as part of a response 1414.

Figure 15:
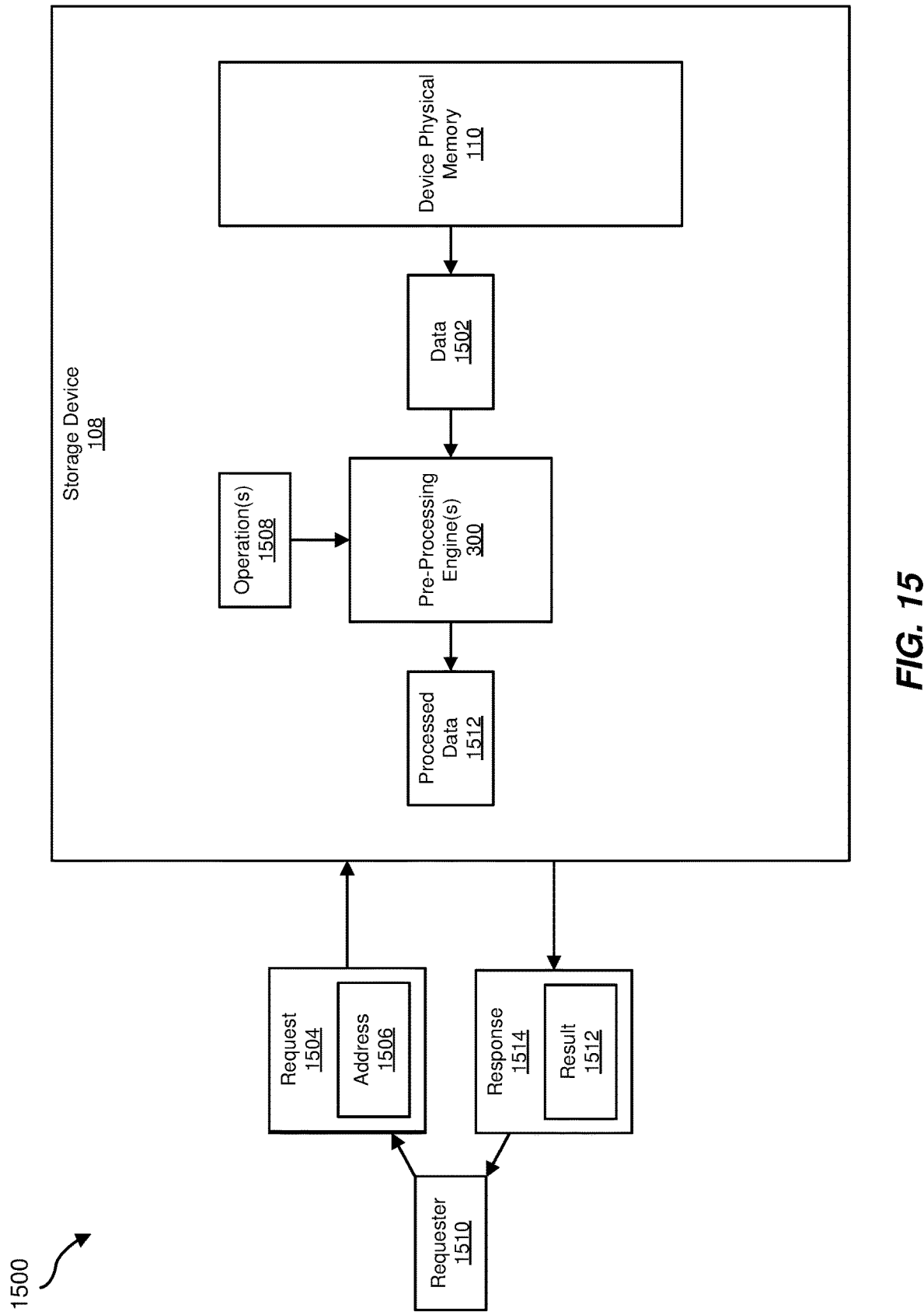
FIG. 15 is a diagram of another exemplary data flow for performing pre-processing operations in connection with reads from coherent host-managed device memory.

FIG. 15 illustrates an exemplary data flow 1500 involving the exemplary pre-processing of data 1502 in response to a request 1504 received from a requester 1510 via cache-coherent bus 116. In this example, request 1504 may be a request to read data from a host address 1506 associated with one or more pre-processing operation(s) 1508. In response to pre-processing request 1504, pre-processing engine(s) 300 may read data 1502 from the physical address of device physical memory 110 corresponding to host address 1506 and may perform pre-processing operation(s) 1508 on data 1502 to generate pre-processed data 1512. In response to request 1504, pre-processing engine(s) 300 may transmit pre-processed data 1512 to requester 1510 via cache-coherent bus 116 as part of a response 1514.

Figure 16:
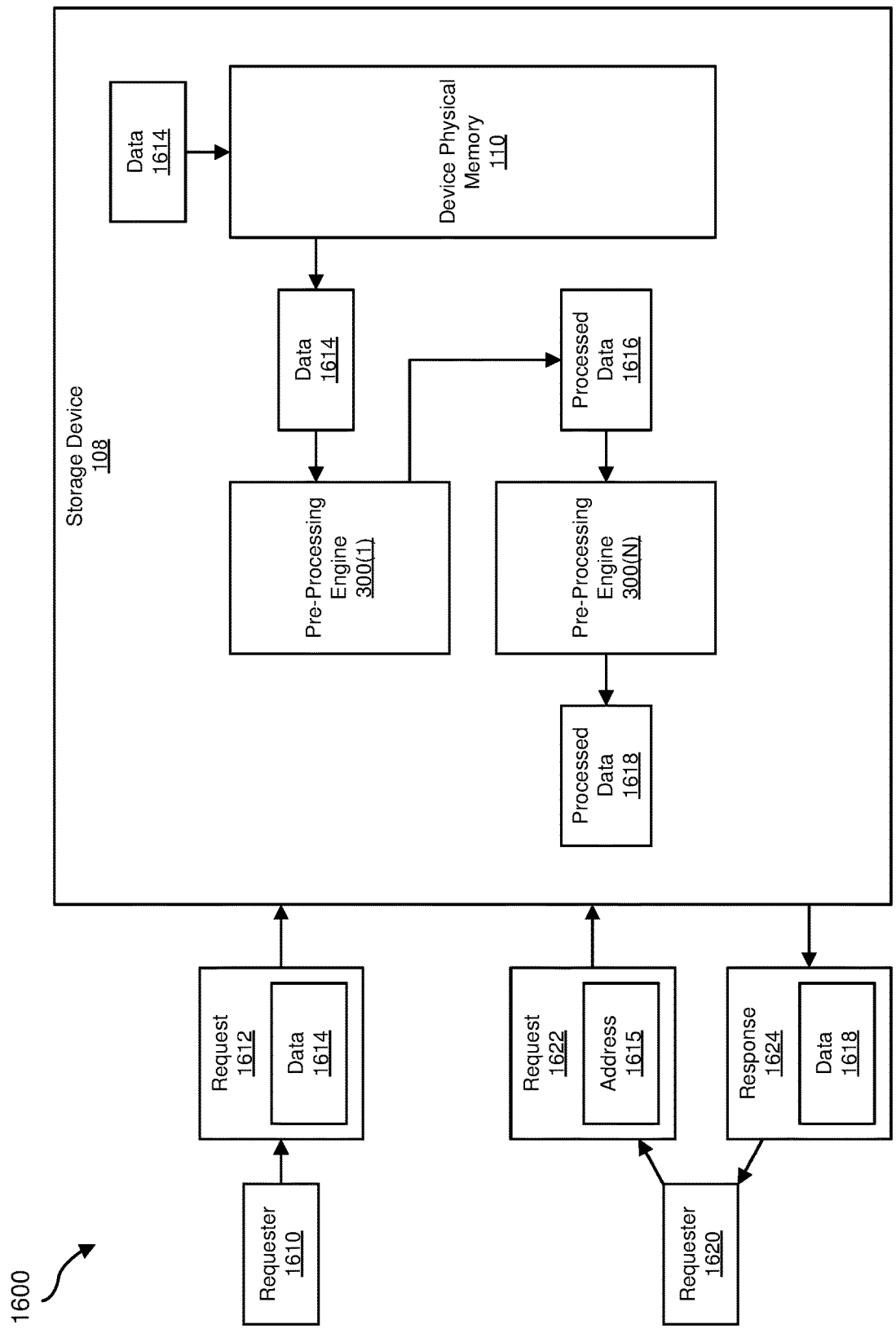
FIG. 16 is a diagram of another exemplary data flow for performing pre-processing operations in connection with reads from coherent host-managed device memory.

FIG. 16 illustrates an exemplary data flow 1600 involving the exemplary pre-processing of data 1614 in response to a request 1622 received from a requester 1620 via cache-coherent bus 116. In this example, data 1614 may have been previously written to device physical memory 110 in response to a write request 1612 received from a requester 1610 via cache-coherent bus 116. In this example, data 1614 may have been written to a physical address of device physical memory 110 corresponding to a host address 1615 designated for pre-processing by pre-processing engine(s) 200. In this example, pre-processing engine 300(1) may, in response to request 1622, read data 1614 from the physical address of device physical memory 110 corresponding to host address 1615, perform a first pre-processing operation on data 1614 to generate pre-processed data 1616, and forward pre-processed data 1616 to pre-processing engine 300(N) for additional pre-processing. In response to receiving pre-processed data 1616 from pre-processing engine 300(1), pre-processing engine 300(N) may perform a second pre-processing operation on pre-processed data 1616 to generate pre-processed data 1618 and transmit pre-processed data 1618 to requester 1620 via cache-coherent bus 116 as part of a response 1624.

Figure 17:
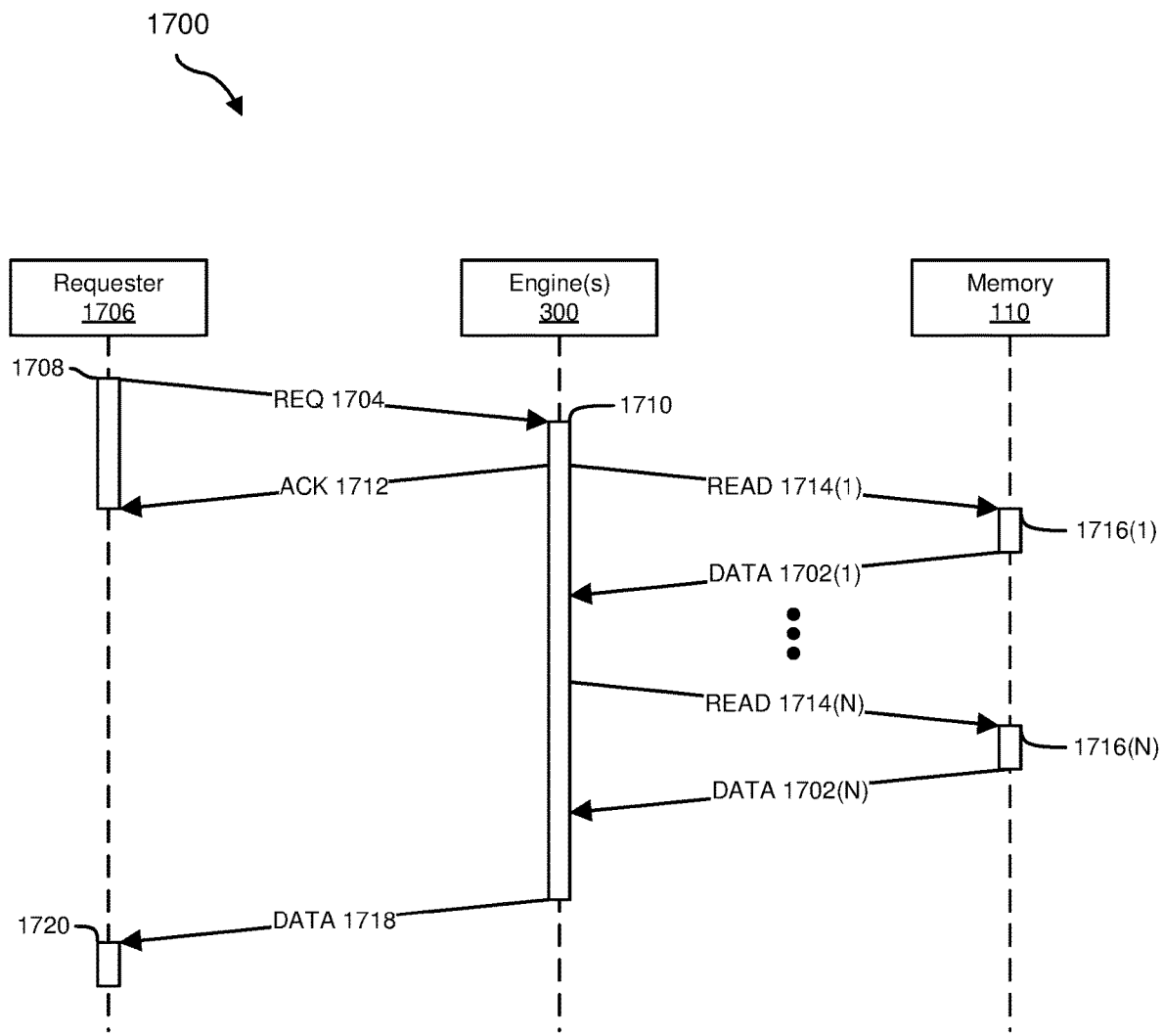
FIG. 17 is a diagram of an exemplary sequence for performing pre-processing operations in connection with writes to coherent host-managed device memory.

FIG. 17 illustrates an exemplary sequence diagram 1700 involving the exemplary pre-processing of data 1702(1)-(N) in response to a pre-processing request 1704 received from a requester 1706 via cache-coherent bus 116. In this example, requester 1706 may, as part of a pre-processing activity 1708, transmit pre-processing request 1704 to access and pre-process data stored to one or more host addresses mapped to device physical memory 110. As part of an asynchronous pre-processing activity 1710, pre-processing engine(s) 300 may respond to pre-processing request 1704 with an acknowledgement 1712. Next, pre-processing engine(s) 300 may transmit read requests 1714(1)-(N) to device physical memory 110 for data 1702(1)-(N). In response to read request 1714(1)-(N), device physical memory 110 may, as part of read activities 1716(1)-(N), return data 1702(1)-(N) to pre-processing engine(s) 300. Once data 1702(1)-(N) are received from device physical memory 110, pre-processing engine(s) 300 may pre-process data 1702(1)-(N) to generate pre-processed data 1718. Pre-processing engine(s) 300 may then complete pre-processing activity 1710 by transmitting pre-processed data 1718 to requester 1706. In some embodiments, requester 1706 may further process pre-processed data 1718 as part of activity 1720.

Figure 18:
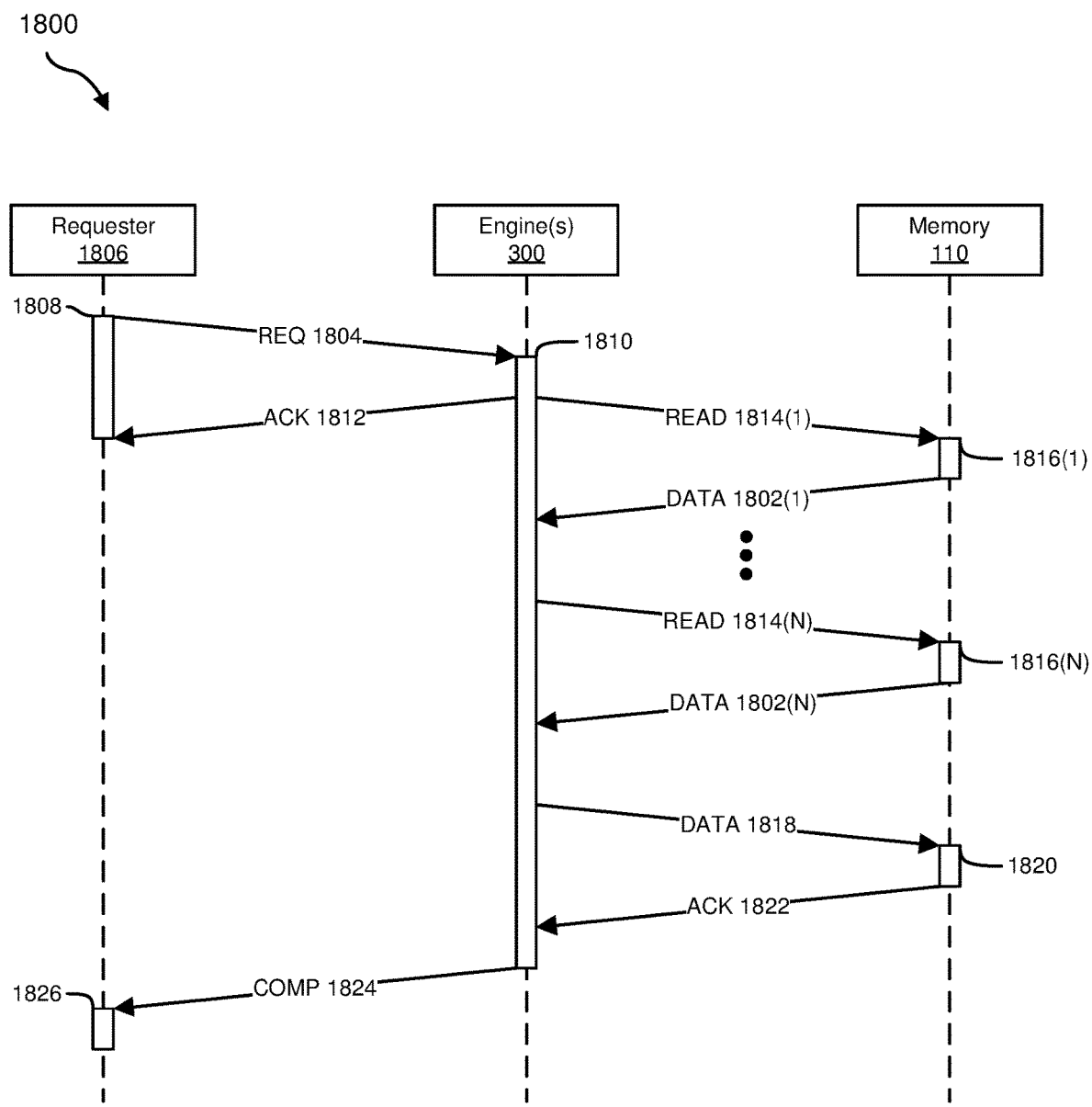
FIG. 18 is a diagram of an exemplary sequence for performing pre-processing operations in connection with writes to coherent host-managed device memory.

In some embodiments, the disclosed systems may respond to a pre-processing request with a notification indicating that pre-process operations have been completed and pre-processed data are available for access or further pre-processing. FIG. 18 illustrates an exemplary sequence diagram 1800 involving the exemplary pre-processing of data 1802(1)-(N) in response to a pre-processing request 1804 received from a requester 1806 via cache-coherent bus 116. In this example, requester 1806 may, as part of a pre-processing activity 1808, transmit pre-processing request 1804 to access and pre-process data stored to one or more host addresses mapped to device physical memory 110. As part of an asynchronous pre-processing activity 1810, pre-processing engine(s) 300 may respond to pre-processing request 1804 with an acknowledgement 1812. Next, pre-processing engine(s) 300 may transmit read requests 1814(1)-(N) to device physical memory 110 for data 1802(1)-(N). In response to read request 1814(1)-(N), device physical memory 110 may, as part of read activities 1816(1)-(N), return data 1802(1)-(N) to pre-processing engine(s) 300. Once data 1802(1)-(N) are received from device physical memory 110, pre-processing engine(s) 300 may pre-process data 1802(1)-(N) to generate pre-processed data 1818 and may write pre-processed data 1818 to device physical memory 110. In response to receiving pre-processed data 1818 from pre-processing engine(s) 300, device physical memory 110 may, as part of completing a writing activity 1820, transmit a write acknowledgement 1822 to pre-processing engine(s) 300. In response to receiving acknowledgement 1822, pre-processing engine(s) 300 may complete pre-processing activity 1810 by transmitting a notification 1824 to requester 1806 informing requester 1806 of completion of pre-processing activity 1806. In some embodiments, requester 1806 may then access data 1818 as part of activity 1826.

As explained above, this application is generally directed to storage devices (e.g., memory expanders or accelerators) that perform various pre- and/or post-processing operations on data read from or written to device-connected memory via a cache-coherent interconnect. Embodiments of the present disclosure may pre-process data read from coherent host-managed device memory before transmitting a result of the pre-processing to a general-purpose host processor or task-specific accelerator and/or may post-process data received from a general-purpose host processor or task-specific accelerator before writing a result of the post-processing to coherent host-managed device memory. By performing pre- and/or post-processing operations on behalf of external host processors and/or task-specific accelerators, the disclosed storage systems may reduce data movement between the external host processors and/or task-specific accelerators and the disclosed storage systems and/or may reduce the computational loads of the external host processors and/or task-specific accelerators.

In some embodiments, the disclosed storage devices may write an image or video to memory, decode the image/video from memory, and then write the decoded image/video back to memory. The decoded image/video may then be made accessible to an external host processor and/or task-specific accelerator for further processing and/or analysis (e.g., via a read operation). In some embodiments, the disclosed storage devices may receive an operation/function (e.g., a sum operation or a database operation) to perform on data stored to host-managed device memory, perform the operation/function locally, and then return a result of the operation to an external host processor and/or task-specific accelerator for further processing or write the result of the operation back to memory for later access by the external host processor and/or task-specific accelerator.

EXAMPLE EMBODIMENTS

Example 1: A storage device having (1) a device-attached physical memory accessible to an external host processor via a cache-coherent interconnect (addresses of the device-attached physical memory being mapped to a coherent memory) and (2) one or more internal physical processors adapted to (a) receive, from the external host processor via the cache-coherent interconnect, a request to write first data to the coherent memory space, (b) perform, after the first data is received at the storage device, one or more post-reception operations on the first data to generate second data, and (c) make the second data accessible to the external host processor via the cache-coherent interconnect by writing the second data to a physical address of the device-attached physical memory corresponding to a host address of the coherent memory space.

Example 2: The storage device of claim 1, wherein the request to write the first data to the coherent memory space includes a request to write the first data to the host address of the coherent memory space.

Example 3: The storage device of any of claims 1-2, wherein the request to write the first data to the coherent memory space includes a request to write the first data to an additional host address of the coherent memory space and the one or more internal physical processors are further adapted to store the first data at the storage device by writing the first data to an additional physical address of the device-attached physical memory corresponding to the additional host address of the coherent memory space.

Example 4: The storage device of any of claims 1-3, wherein a range of addresses of the coherent memory space is associated with one or more post-processing operations and the one or more internal physical processors are adapted to automatically perform the one or more post-processing operations on any data written to the range of addresses.

Example 5: The storage device of any of claims 1-4, wherein a first range of addresses of the coherent memory space is designated for storing a first type of data associated with one or more post-processing operations, a second range of addresses of the coherent memory space is designated for storing a second type of data associated with one or more additional post-processing operations, and the one or more internal physical processors are adapted to (1) automatically perform the one or more post-processing operations on any data written to the first range of addresses and (2) automatically perform the additional one or more post-processing operations on any data written to the second range of addresses.

Example 6: The storage device of any of claims 1-5, wherein the request to write the first data to the coherent memory space includes a request to write the first data to the host address of the coherent memory space and the one or more internal physical processors are adapted to make the second data accessible to the external host processor by transmitting, as part of a response to the request to write the first data to the host address of the coherent memory space, the second data to the external host processor via the cache-coherent interconnect.

Example 7: The storage device of any of claims 1-6, wherein the first data include an encoded image, the one or more post-reception operations include an image-decoding operation, and the second data include a raw image decoded from the encoded image.

Example 8: The storage device of any of claims 1-7, wherein the first data include an encoded video, the one or more post-reception operations include a video-decoding operation, and the second data include a raw video decoded from the encoded video.

Example 9: The storage device of any of claims 1-8, wherein the first data include image data, the one or more post-reception operations include one or more of a decoding operation, a rotation operation, a scaling operation, a color-space conversion, a color correction, a denoising operation, a cropping operation, an exposure compensation, a lens-distortion compensation, and/or a geometric transformation.

Example 10: The storage device of any of claims 1-9, wherein the first data include a video, the one or more post-reception operations include a frame-extracting operation, the one or more internal physical processors are adapted to perform the one or more post-reception operations by extracting one or more frames from the video (the one or more frames comprising less than all of the video's frames), and the second data include the one or more frames extracted from the video.

Example 11: The storage device of any of claims 1-10, wherein the first data include a video, the one or more post-reception operations include a frame-extracting operation and one or more frame transformations, the one or more internal physical processors are adapted to perform the one or more post-reception operations by (1) extracting a first plurality of frames from the video and (2) performing the one or more frame transformations on each of the first plurality of frames to generate a second plurality of frames, and the second data include the second plurality of frames.

Example 12: The storage device of any of claims 1-11, wherein the request to write the first data to the coherent memory space includes an instruction to perform the one or more post-reception operations on the first data.

Example 13: A storage device having (1) a device-attached physical memory managed by and accessible to an external host processor via a cache-coherent interconnect (addresses of the device-attached physical memory being mapped to a coherent memory space of the external host processor) and (2) one or more internal physical processors adapted to (a) receive, from the external host processor via the cache-coherent interconnect, a request to perform one or more pre-transmission operations on first data read from one or more host addresses of the coherent memory space, (b) read the first data from one or more physical addresses of the device-attached physical memory corresponding to the one or more host addresses of the coherent memory space, and (c) perform the one or more pre-transmission operations on the first data to generate second data.

Example 14: The storage device of any of claims 1-13, wherein the one or more internal physical processors are further adapted to respond to the request by transmitting the second data to the external host processor via the cache-coherent interconnect.

Example 15: The storage device of any of claims 1-14, wherein the request to perform the one or more pre-transmission operations on the first data includes a request to write the second data to an additional one or more host addresses of the coherent memory space and the one or more internal physical processors are further adapted to (1) write the second data to one or more additional physical addresses of the device-attached physical memory corresponding to the one or more additional host addresses of the coherent memory space, (2) receive, from the external host processor via the cache-coherent interconnect, a second request to perform one or more additional pre-transmission operations on the second data, (3) read the second data from the one or more additional physical addresses of the device-attached physical memory, (4) perform the one or more additional pre-transmission operations on the second data to generate third data, and (5) respond to the second request by transmitting the third data to the host processor via the cache-coherent interconnect.

Example 16: The storage device of any of claims 1-15, wherein the request to perform the one or more pre-transmission operations on the first data includes a request to perform one or more reduction operations on the first data and the second data are a result of performing the one or more reduction operations on the first data.

Example 17: A computer-implemented method may include receiving, from a host processor via a cache-coherent interconnect, a request to access one or more host addresses of a coherent memory space. When the request is to write data to the one or more host addresses, the computer-implemented method may include (1) performing, after receiving the data, one or more post-processing operations on the data to generate post-processed data and (2) writing the post-processed data to one or more physical addresses of a device-attached physical memory mapped to the one or more host addresses. When the request is to read data from the one or more host addresses, the computer-implemented method may include (1) reading the data from the one or more physical addresses of a device-attached physical memory mapped to the one or more host addresses, (2) performing, before responding to the request, one or more pre-processing operations on the data to generate pre-processed data, and (3) returning the pre-processed data to the external host processor via the cache-coherent interconnect.

Example 18: The computer-implemented method of claim 17, wherein the request is to read data from the one or more host addresses, the request includes the one or more pre-processing operations, and the one or more pre-processing operations include one or more reduction operations.

Example 19: The computer-implemented method of any of claims 17-18, wherein the request is to write data to the one or more host addresses, the data include an encoded image, the one or more post-processing operations include an image-decoding operation, and the post-processed data include a raw image decoded from the encoded image.

Example 20: The computer-implemented method of any of claims 17-19, wherein the request is to write data to the one or more host addresses, the data includes an encoded video; the one or more post-processing operations includes a video-decoding operation, and the post-processed data include a raw video decoded from the encoded video.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed over a cache-coherent interconnect, post-process the data, output a result of the post-processing to device-connected memory, and use the result of the post-processing to respond to future read requests for the result of the post-processing. In another example, one or more of the modules recited herein may read data to be transformed from device-connected memory, pre-process the data, and transmit a result of the pre-processing over a cache-coherent interconnect. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of a device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A storage device comprising:
   a device-attached physical memory accessible to an external host processor or an additional external processor via a cache-coherent interconnect, wherein at least one physical address, of the device-attached physical memory is mapped to at least one host address of a coherent memory space of the external host processor; and
   one or more internal physical processors adapted to:
      receive, from the external host processor or the additional external processor via the cache-coherent interconnect, a request to write first data to the at least one host address of the coherent memory space of the external host processor; and
      write the first data to the at least one host address of the coherent memory space of the external host processor by:
         translating the at least one host address of the coherent memory space of the external host processor to the at least one physical address of the device-attached physical memory;
         performing, contemporaneous with translating the at least one host address to the at least one physical address, one or more post-reception operations on the first data to generate second data; and
         writing the first data or the second data to the at least one physical address of the device-attached physical memory corresponding to the at least one host address of the coherent memory space of the external host processor.

2. The storage device of claim 1, wherein the one or more internal physical processors are adapted to write the first data to the at least one host address of the coherent memory space of the external host processor by writing the second data to the at least one physical address of the device-attached physical memory corresponding to the at least one host address of the coherent memory space of the external host processor.

3. The storage device of claim 1, wherein:
   the request to write the first data to the at least one host address of the coherent memory space of the external host processor comprises an additional host address of the coherent memory space of the external host processor; and
   the one or more internal physical processors are adapted to write the first data to the at least one host address of the coherent memory space of the external host processor by:
      writing the first data to the at least one physical address of the device-attached physical memory corresponding to the at least one host address of the coherent memory space of the external host processor;
      translating the additional host address of the coherent memory space of the external host processor to an additional physical address of the device-attached physical memory; and
      writing the second data to the additional physical address of the device-attached physical memory corresponding to the additional host address of the coherent memory space of the external host processor.

4. The storage device of claim 1, wherein:
   a range of host addresses of the coherent memory space of the external host processor is associated with one or more post-processing operations; and
   the one or more internal physical processors are adapted to automatically perform the one or more post-processing operations on any data written to the range of host addresses.

5. The storage device of claim 1, wherein:
   a first range of host addresses of the coherent memory space of the external host processor is designated for storing a first type of data associated with one or more post-processing operations;
   a second range of host addresses of the coherent memory space of the external host processor is designated for storing a second type of data associated with one or more additional post-processing operations; and
   the one or more internal physical processors are adapted to:

automatically perform the one or more post-processing operations on any data written to the first range of host addresses; and automatically perform the additional one or more post-processing operations on any data written to the second range of host addresses.

6. The storage device of claim 1, wherein
the one or more internal physical processors are adapted to make the second data accessible to the external host processor or the additional external processor by transmitting, as part of a response to the request to write the first data to the at least one host address of the coherent memory space of the external host processor, the second data to the external host processor or the additional external processor via the cache-coherent interconnect.

7. The storage device of claim 1, wherein:
the first data comprise an encoded image;
the one or more post-reception operations comprise an image-decoding operation; and
the second data comprise a raw image decoded from the encoded image.

8. The storage device of claim 1, wherein:
the first data comprise an encoded video;
the one or more post-reception operations comprise a video-decoding operation; and
the second data comprise a raw video decoded from the encoded video.

9. The storage device of claim 1, wherein:
the first data comprise image data;
the one or more post-reception operations comprise one or more of:
 a decoding operation;
 a rotation operation;
 a scaling operation;
 a color-space conversion;
 a color correction;
 a denoising operation;
 a cropping operation;
 an exposure compensation;
 a lens-distortion compensation; or
 a geometric transformation.

10. The storage device of claim 1, wherein:
the first data comprise a video;
the one or more post-reception operations comprise a frame-extracting operation;
the one or more internal physical processors are adapted to perform the one or more post-reception operations by extracting one or more frames from the video, the one or more frames comprising less than all of the video's frames; and
the second data comprise the one or more frames extracted from the video.

11. The storage device of claim 1, wherein:
the first data comprise a video;
the one or more post-reception operations comprise a frame-extracting operation and one or more frame transformations;
the one or more internal physical processors are adapted to perform the one or more post-reception operations by:
 extracting a first plurality of frames from the video; and
 performing the one or more frame transformations on each of the first plurality of frames to generate a second plurality of frames; and
the second data comprise the second plurality of frames.

12. The storage device of claim 1, wherein the request to write the first data to the at least one host address of the coherent memory space comprises an instruction to perform the one or more post-reception operations on the first data.

13. A storage device comprising:
a device-attached physical memory managed by and accessible to an external host processor via a cache-coherent interconnect, wherein one or more physical addresses of the device-attached physical memory are mapped to one or more host addresses of a coherent memory space of the external host processor;
one or more internal physical processors adapted to:
 receive, from the external host processor or an additional external processor via the cache-coherent interconnect, a request to perform one or more pre-transmission operations on first data read from the one or more host addresses of the coherent memory space of the external host processor;
 translate the one or more host addresses of the coherent memory space of the external host processor to the one or more physical addresses of the device-attached physical memory;
 read the first data from the one or more physical addresses of the device-attached physical memory corresponding to the one or more host addresses of the coherent memory space of the external host processor; and
 perform, contemporaneous with translating the one or more host addresses to the one or more physical addresses, the one or more pre-transmission operations on the first data to generate second data.

14. The storage device of claim 13, wherein the one or more internal physical processors are further adapted to respond to the request by transmitting the second data to the external host processor or the additional external processor via the cache-coherent interconnect.

15. The storage device of claim 13, wherein:
the request to perform the one or more pre-transmission operations on the first data comprises a request to write the second data to an one or more additional host addresses of the coherent memory space of the external host processor; and
the one or more internal physical processors are further adapted to:
 translate the one or more additional host addresses of the coherent memory space of the external host processor to one or more additional physical addresses of the device-attached physical memory;
 write the second data to the one or more additional physical addresses of the device-attached physical memory corresponding to the one or more additional host addresses of the coherent memory space;
 receive, from the external host processor or the additional external processor via the cache-coherent interconnect, a second request to perform one or more additional pre-transmission operations on the second data;
 read the second data from the one or more additional physical addresses of the device-attached physical memory;
 perform the one or more additional pre-transmission operations on the second data to generate third data; and
 respond to the second request by transmitting the third data to the external host processor or the additional external processor via the cache-coherent interconnect.

16. The storage device of claim 13, wherein:

the request to perform the one or more pre-transmission operations on the first data comprises a request to perform one or more reduction operations on the first data; and the second data are a result of performing the one or more reduction operations on the first data.

17. A computer-implemented method comprising:

receiving, at a storage device from an external host processor or an additional external processor via a cache-coherent interconnect, a request to access one or more host addresses of a coherent memory space of the external host processor;

translating, at the storage device, the one or more host addresses of the coherent memory space of the external host processor to one or more physical addresses of a device-attached physical memory of the storage device; and when the request is to write data to the one or more host addresses, performing, at the storage device contemporaneous with translating the one or more host addresses to the one or more physical addresses, one or more post-processing operations on the data to generate post-processed data; and writing the post-processed data to the one or more physical addresses of the device-attached physical memory corresponding to the one or more host addresses; and when the request is to read data from the one or more host addresses, reading the data from the one or more physical addresses of the device-attached physical memory corresponding to the one or more host addresses;

performing, at the storage device contemporaneous with translating the one or more host addresses to the one or more physical addresses before responding to the request, one or more pre-processing operations on the data to generate pre-processed data; and returning the pre-processed data to the external host processor or the additional external processor via the cache-coherent interconnect.

18. The computer-implemented method of claim 17, wherein:

the request is to read data from the one or more host addresses;

the request comprises the one or more pre-processing operations; and the one or more pre-processing operations comprise one or more reduction operations.

19. The computer-implemented method of claim 17, wherein:

the request is to write data to the one or more host addresses;

the data comprise an encoded image;

the one or more post-processing operations comprise an image-decoding operation; and the post-processed data comprise a raw image decoded from the encoded image.

20. The computer-implemented method of claim 17, wherein:

the request is to write data to the one or more host addresses;

the data comprise an encoded video;

the one or more post-processing operations comprise a video-decoding operation; and the post-processed data comprise a raw video decoded from the encoded video.

* * * * *